(12) United States Patent
Tomiyama et al.

(10) Patent No.: US 9,665,548 B2
(45) Date of Patent: May 30, 2017

(54) WEBSITE CREATION SYSTEM

(75) Inventors: Kenichi Tomiyama, Tokyo (JP);
Ryosuke Sekido, Tokyo (JP)

(73) Assignee: Japan Registry Services, Co., Ltd.,
Tokyo (JP)

( * ) Notice: Subject to any disclaimer, the term of this patent is extended or adjusted under 35 U.S.C. 154(b) by 727 days.

(21) Appl. No.: 13/980,333

(22) PCT Filed: Jan. 25, 2012

(86) PCT No.: PCT/JP2012/051560
§ 371 (c)(1),
(2), (4) Date: Sep. 3, 2013

(87) PCT Pub. No.: WO2012/102307
PCT Pub. Date: Aug. 2, 2012

(65) Prior Publication Data

US 2013/0339845 A1 Dec. 19, 2013

(30) Foreign Application Priority Data

Jan. 25, 2011 (JP) ................................. 2011-012501

(51) Int. Cl.
*G06F 17/00* (2006.01)
*G06F 17/22* (2006.01)
(Continued)

(52) U.S. Cl.
CPC ...... *G06F 17/2247* (2013.01); *G06F 17/3089* (2013.01); *G06F 17/30893* (2013.01); *H04L 51/36* (2013.01)

(58) Field of Classification Search
CPC ........... G06F 17/30014; G06F 17/3089; G06F 17/24; G06F 17/30893
(Continued)

(56) References Cited

U.S. PATENT DOCUMENTS 6,519,589 B2 * 2/2003 Mann ................ G06F 17/30876
7,093,014 B2 * 8/2006 Nino ........................ H04L 67/16
709/219
(Continued)

FOREIGN PATENT DOCUMENTS

JP 2000-276417 10/2000
JP 2001-142820 5/2001
(Continued)

OTHER PUBLICATIONS

Scaglione et al., Investigating Domain Name Diffusion across Swiss Accommodation Enterprises, Springer 2005, pp. 1-11.*
(Continued)

*Primary Examiner* — Cong-Lac Huynh
(74) *Attorney, Agent, or Firm* — Clark & Brody

(57) ABSTRACT

[Problem] To provide a website creation system wherein a plurality of websites can be set up and web pages created therefor, using mobile phones. [Solution] A website creation system that has: a first email-address registration means that registers the email addresses of intermediate-user mobile phones (12) belonging respectively to a plurality of intermediate users; a website setup means that uses intermediate-user mobile phones (12) that logged in to the system to set up a plurality of websites corresponding respectively to preregistered domain names; a first web-page creation means that uses mobile emails, sent from the intermediate-user mobile phones (12) that logged in to the system, to create web pages for the websites corresponding respectively to the aforementioned domain names; and a first website output means that outputs, via the internet, the websites containing the web pages created by the first web-page creation means.

15 Claims, 35 Drawing Sheets

(51) Int. Cl.
*G06F 17/30* (2006.01)
*H04L 12/58* (2006.01)

(58) Field of Classification Search
USPC .......................................... 715/205, 206, 255
See application file for complete search history.

(56) References Cited

U.S. PATENT DOCUMENTS

| | | | | |
|---|---|---|---|---|
| 8,224,794 | B2* | 7/2012 | Rappaport | G06Q 10/067 455/406 |
| 8,296,643 | B1* | 10/2012 | Vasilik | G06F 17/3089 715/200 |
| 8,407,314 | B2* | 3/2013 | Chaturvedi | H04L 67/1097 709/217 |
| 9,412,106 | B2* | 8/2016 | Laracey | G06Q 20/1085 |
| 2004/0083114 | A1* | 4/2004 | Yue | G06Q 10/10 709/219 |
| 2007/0038931 | A1* | 2/2007 | Allaire | G06Q 30/0239 715/206 |
| 2008/0155614 | A1* | 6/2008 | Cooper | G06F 21/10 725/91 |
| 2009/0119315 | A1* | 5/2009 | Kasbarian | G06F 17/3087 |
| 2009/0228561 | A1* | 9/2009 | Finkeldey | G06Q 30/02 709/206 |
| 2010/0042931 | A1* | 2/2010 | Dixon | G06F 17/30861 715/738 |
| 2010/0094976 | A1* | 4/2010 | Kanefsky | H04M 1/72561 709/219 |
| 2010/0275014 | A1* | 10/2010 | Kelley | G06F 21/51 713/157 |
| 2011/0055331 | A1* | 3/2011 | Adelman | G06Q 10/107 709/206 |
| 2011/0066930 | A1* | 3/2011 | Rowe | G06Q 30/02 715/205 |
| 2011/0125831 | A1* | 5/2011 | Adelman | G06F 17/30873 709/203 |
| 2012/0173685 | A1* | 7/2012 | Shorter | H04L 29/12066 709/223 |
| 2012/0233351 | A1* | 9/2012 | Gorgens | H04L 61/1511 709/245 |
| 2013/0031466 | A1* | 1/2013 | Curran | H04L 61/1511 715/234 |
| 2013/0073975 | A1* | 3/2013 | Bladel | G06Q 50/265 715/739 |
| 2013/0124662 | A1* | 5/2013 | Yamamoto | G06F 13/00 709/206 |
| 2013/0167009 | A1* | 6/2013 | Tymoshenko | G06F 17/30887 715/234 |
| 2013/0305328 | A1* | 11/2013 | Leung | H04L 63/0807 726/6 |
| 2014/0026025 | A1* | 1/2014 | Smith | G06Q 10/101 715/230 |
| 2014/0136837 | A1* | 5/2014 | Baylina Mele | H04L 63/083 713/155 |
| 2014/0221102 | A1* | 8/2014 | LaMontange | A63F 13/335 463/42 |
| 2014/0278609 | A1* | 9/2014 | Capps | G06Q 20/208 705/5 |
| 2015/0007022 | A1* | 1/2015 | Chen | G06F 17/3089 715/235 |
| 2015/0106687 | A1* | 4/2015 | McLaughlin | G06Q 30/02 715/234 |
| 2015/0120691 | A1* | 4/2015 | Blemaster | G06Q 30/0256 707/706 |
| 2016/0026623 | A1* | 1/2016 | Blodgett | G06F 17/289 704/2 |
| 2016/0179769 | A1* | 6/2016 | Gershom | G06F 17/30345 715/235 |

FOREIGN PATENT DOCUMENTS

| | | |
|---|---|---|
| JP | 2003-296233 | 10/2003 |
| JP | 2005-157965 | 6/2005 |
| JP | 2006-148576 | 6/2006 |

OTHER PUBLICATIONS

Landau, Problems Arising out of the Use of "www.trademark.com": the Application of Principles of Trademark Law to Internet Domain Name Disputes, Google 2001, pp. 1-67.*
The translation of description of JP2000276417 (JP2000276417-EPO.pdf).*
Sellen et al., How Knowledge Workers Use the Web, ACM 2002, pp. 227-234.*
Wang, Domain Names Management and Legal Protection, Elsevier 2005, pp. 116-127.*

* cited by examiner

FIG. 9

| REDIRECTION YET-TO-BE-SET DOMAIN NAME DISPLAY |
|---|
| example1 .JP<br>REGISTERED COMPANY NAME: ○○○○ KABUSHIKI KAISHA<br>DEPARTMENT AND SECTION: SALES DEPARTMENT<br>NAME OF PERSON IN CHARGE:○○○<br>DAY/MONTH/YEAR Registered |
| example2 .JP<br>REGISTERED COMPANY NAME: ○○○○ KABUSHIKI KAISHA<br>DEPARTMENT AND SECTION: SALES DEPARTMENT<br>NAME OF PERSON IN CHARGE:○○○<br>DAY/MONTH/YEAR Registered |
| example3 .JP<br>REGISTERED COMPANY NAME: ○○○○ KABUSHIKI KAISHA<br>DEPARTMENT AND SECTION: SALES DEPARTMENT<br>NAME OF PERSON IN CHARGE:○○○<br>DAY/MONTH/YEAR Registered |
| 9b — RETURN |
| 9c — RETURN TO MENU |

| DOMAIN NAME SEPARATELY SET DISPLAY |
|---|
| REDIRECTION YET TO BE SET |
| example1 .JP<br>REGISTERED COMPANY NAME: ○○○○ KABUSHIKI KAISHA<br>DEPARTMENT AND SECTION: SALES DEPARTMENT<br>NAME OF PERSON IN CHARGE:○○○<br>DAY/MONTH/YEAR Registered |
| 10b ~ RETURN          NEXT ~10c |
| 10d ~ RETURN TO MENU |

10a points to the information block; 10b to RETURN; 10c to NEXT; 10d to RETURN TO MENU.

FIG. 11

| REDIRECTION SET DOMAIN NAME DISPLAY |
|---|
| example1.JP<br>REGISTERED COMPANY NAME: ○○○○ KABUSHIKI KAISHA<br>DEPARTMENT AND SECTION: SALES DEPARTMENT<br>NAME OF PERSON IN CHARGE:○○○<br>DAY/MONTH/YEAR Registered |
| example2.JP<br>REGISTERED COMPANY NAME: ○○○○ KABUSHIKI KAISHA<br>DEPARTMENT AND SECTION: SALES DEPARTMENT<br>NAME OF PERSON IN CHARGE:○○○<br>DAY/MONTH/YEAR Registered |
| 11b ─ [RETURN] |
| 11c ─ RETURN TO MENU |

11a (rows 1 and 2)

FIG. 12

```
DOMAIN NAME SEPARATELY SET DISPLAY
─────────────────────────────────────
         REDIRECTION SET
─────────────────────────────────────
example1 .JP
REGISTERED COMPANY NAME: ○○○○ KABUSHIKI KAISHA
12a ─ DEPARTMENT AND SECTION: SALES DEPARTMENT
NAME OF PERSON IN CHARGE:○○○
DAY/MONTH/YEAR Registered 12b ─[RETURN]              [NEXT] ─12c RETURN TO MENU
                 │
                12d
```

FIG. 13

```
        REDIRECTION SETTING
    ─────────────────────────
    ENTER DOMAIN NAME ON WHICH
    REDIRECTION IS TO BE SET.

13a─[          ] .JP
13b─[NEXT]

13c─ RETURN TO MENU
```

FIG. 14

| REDIRECTION SETTING |
|---|

14a — example1.JP
REGISTERED COMPANY NAME: ○○○○ KABUSHIKI KAISHA
DEPARTMENT AND SECTION: SALES DEPARTMENT
NAME OF PERSON IN CHARGE: ○○○
DAY/MONTH/YEAR Registered

DESIGNATE REDIRECTION DESTINATION URL AND PRESS "NEXT".

REDIRECTION DESTINATION URL

14b — http://

14c — NEXT        14d — CANCEL

14e — RETURN TO MENU

FIG. 15

| REDIRECTION SETTING |
|---|

15a — example1.JP
REGISTERED COMPANY NAME: ○○○○ KABUSHIKI KAISHA
DEPARTMENT AND SECTION: SALES DEPARTMENT
NAME OF PERSON IN CHARGE: ○○○
DAY/MONTH/YEAR Registered SET REDIRECTION
15b — REDIRECTION DESTINATION URL
http://example4.jp/xxx/

15c — SET        15d — CANCEL

15e — RETURN TO MENU

FIG. 16

| REDIRECTION SETTING |
|---|
| 16a — example1.JP<br>REGISTERED COMPANY NAME: ○○○○ KABUSHIKI KAISHA<br>DEPARTMENT AND SECTION: SALES DEPARTMENT<br>NAME OF PERSON IN CHARGE: ○○○<br>DAY/MONTH/YEAR Registered |
| 16b — REDIRECTION SETTING COMPLETED<br>REDIRECTION DESTINATION URL |
| 16c — RETURN TO MENU |

FIG. 17

| REGISTERED DOMAIN NAME DELETION |
|---|
| ENTER DOMAIN NAME TO BE DELETED |
| 17a — [          ] .JP<br>17b — [NEXT] |
| 17c — RETURN TO MENU |

FIG. 18

```
┌─────────────────────────────────────────────┐
│         REGISTERED DOMAIN NAME DELETION     │
├─────────────────────────────────────────────┤
│  example1.JP                                │
│  REGISTERED COMPANY NAME: ○○○○ KABUSHIKI KAISHA │
│  DEPARTMENT AND SECTION: SALES DEPARTMENT   │
│  NAME OF PERSON IN CHARGE:○○○               │
│  DAY/MONTH/YEAR Registered                  │
├─────────────────────────────────────────────┤
│  PRESS "NEXT" TO DELETE REGISTRATION        │
│  OF DISPLAYED DOMAIN NAME                   │
│                                             │
│   [NEXT]         18c — CANCEL               │
├─────────────────────────────────────────────┤
│         18d — RETURN TO MENU                │
└─────────────────────────────────────────────┘
```
18a (info box), 18b (NEXT)

FIG. 19

```
┌─────────────────────────────────────────────┐
│         REGISTERED DOMAIN NAME DELETION     │
├─────────────────────────────────────────────┤
│  example1.JP                                │
│  REGISTERED COMPANY NAME: ○○○○ KABUSHIKI KAISHA │
│  DEPARTMENT AND SECTION: SALES DEPARTMENT   │
│  NAME OF PERSON IN CHARGE:○○○               │
│  DAY/MONTH/YEAR Registered                  │
├─────────────────────────────────────────────┤
│  CHECK DOMAIN NAME AGAIN                    │
│  DELETE DOMAIN NAME.                        │
│                                             │
│   [DELETE]       19c — CANCEL               │
├─────────────────────────────────────────────┤
│         19d — RETURN TO MENU                │
└─────────────────────────────────────────────┘
```
19a (info box), 19b (DELETE)

| REGISTERED DOMAIN NAME DELETION |
|---|
| example1.JP<br>REGISTERED COMPANY NAME: ○○○○ KABUSHIKI KAISHA<br>DEPARTMENT AND SECTION: SALES DEPARTMENT<br>NAME OF PERSON IN CHARGE: ○○○<br>DAY/MONTH/YEAR Registered |
| DELETE REGISTRATION OF DOMAIN NAME ABOVE |
| 20b — RETURN TO MENU |

MOBILE WEB REGISTRATION

BUSINESS OPERATOR NUMBER — 23a
OOOO-xxxx

BUSINESS OPERATOR'S NAME — 23b
OOOO KABUSHIKI KAISHA

REMARKS
SALES DEPARTMENT OO — 23c
NAME OOOO — 23d

REGISTER — 23e    CANCEL — 23f (b)

MOBILE WEB REGISTRATION

REGISTRATION OF MOBILE TELEPHONE HAS BEEN COMPLETED. REGISTRATION COMPLETION E-MAIL HAS BEEN SENT.

USE IMMEDIATELY — 23g

USE LATER — 23h

FIG. 26

```
WEBSITE ESTABLISHMENT

ENTER DOMAIN NAME AND
ESTABLISH SITE

26a─[          ] .JP

POSTING E-MAIL ADDRESS (OPTIONAL)
26b─[          ]

IDENTIFIER (OPTIONAL)
26c─[          ]

REMARKS (OPTIONAL)
26d─[          ]

POSTING E-MAIL ADDRESS IS FOR
USE IN POSTING PAGE TO SITE

26e─[ NEXT ]

26f─ RETURN TO MENU
```

| WEBSITE ESTABLISHMENT |
|---|
| SITE ESTABLISHMENT COMPLETION NOTIFICATION |
| DOMAIN NAME YOU APPLIED FOR<br>27g— example3.jp<br>IS AVAILABLE |
| SEND E-MAIL TO E-MAIL ADDRESS BELOW TO MAKE PAGE ON MOBILE WEB<br>27h— exam3@example.jp |
| RETURN TO MENU —27i |

(a)

| WEBSITE ESTABLISHMENT |
|---|
| SITE NAME<br>27a— example3.jp |
| POSTING E-MAIL ADDRESS<br>27b— exam3@example.jp |
| IDENTIFIER<br>27c— ○○○○○ |
| REMARKS<br>27d— ○○○○○ STORE |
| ESTABLISH WEB   CANCEL<br>27e             27f |

WEBSITE CREATION SYSTEM

TECHNICAL FIELD

The present invention relates to a website creation system that establishes various websites and creates web pages of the websites which the system established.

BACKGROUND ART

There is a mobile telephone for accessing a website, the mobile telephone including a URL transmitting unit that transmits a URL to a website, an acquiring unit that acquires page data of the website, a converting unit that converts the acquired page data in such a way that the data can be displayed on the mobile telephone, and a displaying unit that displays a page of the website by the converted page data (refer to Patent Document 1).

When the user of this mobile telephone views a website on the mobile telephone, the user enters a URL of a website which the user desires to access from the mobile telephone main body and accesses the website. The page, data of the designated website is transmitted to the mobile telephone from the website, and the mobile telephone acquires the page data. The mobile telephone determines whether or not the acquired page is a displayable page while storing the acquired data in a page information stack area. If it is determined that it is a displayable website by a unique function of the mobile telephone, the page is displayed on a display section; if it is a page which cannot be displayed, the page is converted into a displayable form by a conversion device and is then displayed on the display section. This mobile telephone can access a website offered on the Internet and can display a page of the website.

Patent Document 1: JP-A-2003-296233

DISCLOSURE OF INVENTION

Problem to be Solved by the Invention

With the mobile telephone disclosed in Patent Document 1 above, it is impossible to acquire a plurality of domain names by using the mobile telephone and establish websites corresponding to the domain names. Moreover, it is impossible to create web pages of websites by text messages while posting the text messages from the mobile telephone and output the websites including the web pages through the Internet.

An object of the present invention is to provide a website creation system that can establish various websites by using a mobile telephone and create web pages of the websites which the system established.

Means for Solving Problem

A premise of the present invention to solve the problems described above is a website creation system that establishes various websites and creates web pages of the websites which the system established.

A feature of the present invention based on the above premise is that the website creation system includes an e-mail address first registering unit that registers e-mail addresses of intermediate user mobile telephones of a plurality of intermediate users who can establish websites for introducing a plurality of end users, a website establishing unit that establishes, by using the intermediate user mobile telephones that have logged in to the system, a plurality of websites corresponding to domain names registered in advance, a web page first creating unit that creates web pages of the websites corresponding to the domain names by using text messages sent from the intermediate user mobile telephones that have logged in to the system, and a website first outputting unit that outputs, through the Internet, the websites including the web pages created by the web page first creating unit.

As an example of the present invention, the website creation system includes an e-mail sending first requesting unit that makes the intermediate user mobile telephones of the intermediate users send text messages to a predetermined e-mail address and a URL first transmitting unit that transmits intermediate user registration URLs corresponding to the e-mail addresses of the intermediate user mobile telephones to the intermediate user mobile telephones by using the e-mail addresses of the intermediate user mobile telephones, in the e-mail address first registering unit, when the text messages are sent from the intermediate user mobile telephones by the e-mail sending first requesting unit, the e-mail addresses of the intermediate user mobile telephones are registered, in the website establishing unit, a website is established by logging in to the system through use of the intermediate user registration URL, and, in the web page first creating unit, a web page is created by logging in to the system through use of the intermediate user registration URL.

As another example of the present invention, the website creation system includes a domain name registering unit that, when domain names are applied for from the intermediate user mobile telephones that have logged in to the system by using the intermediate user registration URLs, registers the domain names in a state in which the domain names are associated with the e-mail addresses of the intermediate user mobile telephones.

As another example of the present invention, in the website establishing unit, posting e-mail addresses and identifiers transmitted from the intermediate user mobile telephones that have logged in to the system by using the intermediate user registration URLs are registered in a state in which the posting e-mail addresses and the identifiers are associated with the e-mail addresses of the intermediate user mobile telephones.

As another example of the present invention, the website creation system includes an e-mail sending second requesting unit that makes end user mobile telephones of a plurality of end users who can create particular websites for introducing the end users send text messages to the posting e-mail addresses, an e-mail address second registering unit that registers e-mail addresses of the end user mobile telephones when the text messages are sent from the end user mobile telephones by the e-mail sending second requesting unit, a web page second creating unit that creates a web page of a website corresponding to a domain name of a particular end user, the web site established by the website establishing unit, by using the text messages sent from the end user mobile telephones that have logged in to the system, and a website second outputting unit that outputs, through the Internet, the website including the web page created by the web page second creating unit.

As another example of the present invention, the website creation system includes a URL second transmitting unit that transmits end user registration URLs corresponding to the e-mail addresses of the end user mobile telephones to the end user mobile telephones by using e-mail addresses of the end users and an end user registering unit that registers the end users in the system by using the end user registration URLs and the identifiers, and, in the web page second creating unit, the end users registered by the end user registering unit can log in to the system and create a web page of the website.

As another example of the present invention, the website creation system includes a web page first editing unit that edits web pages of the websites corresponding to the domain names by using text messages sent from the intermediate user mobile telephones that have logged in to the system, and, in the website first outputting unit, the websites including the edited web pages are output through the Internet.

As another example of the present invention, the website creation system includes a web page first deleting unit that deletes a web page to be deleted of the websites corresponding to the domain names according to a web page deletion request transmitted from the intermediate user mobile telephones that have logged in to the system.

As another example of the present invention, the website creation system includes a web page second editing unit that edits a web page of a website corresponding to a domain name of a particular end user, the website established by the website establishing unit, by using text messages sent from the end user mobile telephones that have logged in to the system, and, in the website second outputting unit, the website including the edited web page is output through the Internet.

As another example of the present invention, the website creation system includes a web page second deleting unit that deletes a web page to be deleted of a website corresponding to a domain name of a particular end user, the website established by the website establishing unit, according to a web page deletion request transmitted from the end user mobile telephones that have logged in to the system.

As another example of the present invention, in the web page second editing unit, a web page of a website is edited by logging in to the system through use of the end user registration URL, and, in the web page second deleting unit, a web page to be deleted is deleted by logging in to the system through use of the end user registration URL.

As another example of the present invention, the website creation system includes a domain name charging unit that charges at least either the intermediate user mobile telephones or the end user mobile telephones for domain names when the domain names are registered by the domain name registering unit.

As another example of the present invention, the website creation system includes a registered domain name displaying unit that displays a plurality of domain names that are already registered via the domain name registering unit on the intermediate user mobile telephones that have logged in to the system by using the intermediate user registration URLs.

As another example of the present invention, the website creation system includes an access destination changing unit that changes, when the intermediate user mobile telephones access a particular domain name, changes an access destination to another URL that is different from the domain name.

As another example of the present invention, the website creation system includes a registered domain name deleting unit that deletes any one of a plurality of registered domain names in the intermediate user mobile telephones that have logged in to the system by using the intermediate user registration URLs.

As another example of the present invention, the website creation system includes an end user registration deleting unit that deletes the registration of an end user registered by the end user registering unit by using the intermediate user mobile telephone.

Effect of the Invention

According to the website creation system of the present invention, since it is possible to establish a plurality of websites corresponding to the domain names registered in advance by using the intermediate user mobile telephones and create web pages of the websites corresponding to the domain names by using the text messages sent from the intermediate user mobile telephones, it is possible to establish a website easily and promptly via the mobile telephone of the intermediate user and create a web page of the website easily and promptly via the mobile telephone of the intermediate user. Since the website creation system creates web pages of websites for introducing a plurality of end users by using the intermediate user mobile telephones, it is possible to promote products and service of the plurality of end users to a wide range of people through the web pages and accelerate the use of the websites by the end users themselves. Since the websites including the web pages created by the intermediate user mobile telephones are output through the Internet, the website creation system can pass on information on the products and service of the plurality of end users to the entire world through the Internet.

The website creation system that makes the intermediate user mobile telephones of the intermediate users send text messages to a predetermined e-mail address and transmits the intermediate user registration URLs corresponding to the e-mail addresses of the intermediate user mobile telephones to the intermediate user mobile telephones by using the e-mail addresses of the intermediate users can reliably register the e-mail addresses of the intermediate user mobile telephones by making the intermediate user mobile telephones send the text messages to the predetermined e-mail address, and can make them log in to the system smoothly by using the intermediate user registration URLs by transmitting the intermediate user registration URLs corresponding to the e-mail addresses. The website creation system can establish a plurality of websites corresponding to the domain names by using the intermediate user mobile telephones that have logged in to the system by using the intermediate user registration URLs, and can create web pages of the websites corresponding to the domain names by using the text messages sent from the intermediate user mobile telephones. The website creation system can establish a website easily and promptly via the mobile telephone of the intermediate user and can create a web page of the website easily and promptly via the mobile telephone of the intermediate user.

The website creation system that registers, when domain names are applied for from the intermediate user mobile telephones that have logged in to the system by using the intermediate user registration URLs, the domain names in a state in which the domain names are associated with the e-mail addresses of the intermediate user mobile telephones can register a plurality of domain names by using the intermediate user mobile telephones, can establish a plurality of websites corresponding to the domain names, and can create web pages of the websites corresponding to the domain names by using the text messages sent from the intermediate user mobile telephones. The website creation system can establish a website easily and promptly via the mobile telephone of the intermediate user and can create a web page of the website easily and promptly via the mobile telephone of the intermediate user.

The website creation system that registers posting e-mail addresses and identifiers transmitted from the intermediate user mobile telephones that have logged in to the system in a state in which the posting e-mail addresses and the identifiers are associated with the e-mail addresses of the intermediate user mobile telephones can create web pages of the websites corresponding to the domain names by sending text messages from the intermediate user mobile telephones to the posting e-mail addresses and can create a web page of a website easily and promptly via the mobile telephone of the intermediate user. By registering an identifier associated with the e-mail address of the intermediate user mobile telephone, the website creation system can identify the intermediate user mobile telephone by using the identifier and authorize each intermediate user mobile telephone to access the system by the identifier.

The website creation system that makes the end user mobile telephones of a plurality of end users send text messages to a posting e-mail address, registers the e-mail addresses of the end user mobile telephones when the text messages are sent from the end user mobile telephones, creates a web page of a website corresponding to the domain name of a particular end user by using the text messages sent from the end user mobile telephones, and outputs the website including the created web page through the Internet can establish a plurality of websites corresponding to the domain names, can create a web page of a website corresponding to a particular domain name by using the text message sent from the end user mobile telephone, and can create a web page of a website easily and promptly via the mobile telephone of the end user. Since the website creation system creates a web page of each website for introducing a particular end user by using the end user mobile telephone, it is possible to promote a product and service of the particular end user to a wide range of people through the created web page, and, since the website including the created web page is output through the Internet, it is possible to pass on information on the product and service of the end user to the entire world through the Internet. By making the end user mobile telephone send a text message to a predetermined e-mail address, the website creation system can reliably register the e-mail address of the end user mobile telephone.

The website creation system that transmits end user registration URLs corresponding to the e-mail addresses of the end user mobile telephones to the end user mobile telephones by using the e-mail addresses of the end users and registers the end users in the system by using the end user registration URLs and identifiers can prevent an unauthorized registration of the end user by using the end user registration URL and the identifier as a condition for registration in the system. By transmitting the end user registration URL corresponding to the e-mail address, the website creation system can make the end user mobile telephone smoothly log in to the system by using the end user registration URL. The website creation system can create a web page of a website corresponding to each particular domain name easily and promptly by using the text message sent from the end user mobile telephone registered through use of the end user registration URL and the identifier.

Since the website creation system that edits the web pages of the websites corresponding to the domain names by using the text messages sent from the intermediate user mobile telephones allows the intermediate user to edit the web pages of the websites corresponding to the domain names by using the intermediate user mobile telephone, it is possible to make attractive web pages while editing the web pages via the intermediate user mobile telephone. Since the website creation system edits the web pages of the websites for introducing a plurality of end users by using the intermediate user mobile telephones, it is possible to promote products and service of the plurality of end users to a wide range of people through the edited web pages and accelerate the use of the websites by the end users themselves. Since the websites including the web pages edited by the intermediate user mobile telephones are output through the Internet, the website creation system can pass on information on the products and service of the plurality of end users to the entire world through the Internet.

Since the website creation system that deletes a web page to be deleted of a website corresponding to each domain name according to a web page deletion request transmitted from the intermediate user mobile telephone allows the intermediate user to delete an unnecessary web page by using the intermediate user mobile telephone, it is possible to make attractive web pages while deleting an unnecessary web page via the intermediate user mobile telephone.

Since the website creation system that edits a web page of a website corresponding to the domain name of a particular end user by using the text message sent from the end user mobile telephone allows the end user to edit a web page of a website corresponding to a particular domain name by using the end user mobile telephone, it is possible to make attractive web pages while editing the web page via the end user mobile telephone. Since the website creation system edits the web page of each website for introducing a particular end user by using the end user mobile telephone, it is possible to promote a product and service of the particular end user to a wide range of people through the edited web page and, since the website including the edited web page is output through the Internet, it is possible to pass on information on the product and service of the end user to the entire world through the Internet.

Since the website creation system that deletes a web page to be deleted of a website corresponding to the domain name of a particular end user according to a web page deletion request transmitted from the end user mobile telephone allows the end user to delete an unnecessary web page by using the end user mobile telephone, it is possible to make attractive web pages while deleting an unnecessary web page via the end user mobile telephone.

Since the website creation system that edits a web page of a website by logging in to the system by using the end user registration URL and deletes a web page to be deleted by logging in to the system by using the end user registration URL can edit web pages of the websites corresponding to the domain names by using the end user mobile telephone that has logged in to the system by using the end user registration URL and can delete an unnecessary web page, it is possible to make attractive web pages while editing or deleting a web page via the end user mobile telephone of the end user.

The website creation system that charges at least either the intermediate user mobile telephones or the end user mobile telephones for domain names when the domain names are registered by the domain name registering unit can collect the registration fee of the domain name from the mobile telephones by charging the intermediate user mobile telephones or the end user mobile telephones for the registration fee of the domain name for the registration of the domain name, can reliably manage the domain name while using the collected registration fee of the domain name, and can prevent improper use of the domain name.

The website creation system that displays a plurality of registered domain names that are already registered via the domain name registering unit on the intermediate user mobile telephones can check the registered domain names and prevent an application for the same domain name in advance. Moreover, it is possible to know the domain name trend and thereby determine an optimum domain name.

The website creation system that changes, when the intermediate user mobile telephone accesses a particular domain name, changes an access destination to another URL that is different from the domain name can display an already created web page of an already established website through the Internet by changing the access destination to another URL even when a website corresponding to the domain name is not established or a web page of a website corresponding to the domain name is not created. Moreover, when another website is already established, by changing the access destination to the URL of the other website, it is possible to use the other website which is already made while using the domain name and thereby save the effort of establishing a website again.

Since the website creation system that deletes any one of a plurality of registered domain names in the intermediate user mobile telephone allows the intermediate user to delete an unnecessary domain name by using the intermediate user mobile telephone, it is possible to organize the domain names while deleting an unnecessary domain name via the intermediate user mobile telephone. Moreover, when a wrong domain name is registered, it is possible to delete the domain name.

The website creation system including a user registration deleting unit that deletes the registration of the end user registered by the end user registering unit by using the intermediate user mobile telephone can prevent the establishment of a website which is not necessary for the end user and the creation of an unnecessary web page by deleting the registration of an end user who does not desire to use the system and an end user who desires to terminate the use of the system.

BRIEF DESCRIPTION OF DRAWINGS

FIG. 9 is a diagram depicting an example of a redirection yet-to-be-set domain name display screen;

FIG. 10 is a diagram depicting an example of a redirection yet-to-be-set domain name individual display screen;

FIG. 11 is a diagram depicting an example of a redirection set domain name display screen;

FIG. 12 is a diagram depicting an example of a redirection set domain name individual display screen;

FIG. 13 is a diagram depicting an example of a redirection setting screen;

FIG. 14 is a diagram depicting the redirection setting screen continued from FIG. 13;

FIG. 15 is a diagram depicting the redirection setting screen continued from FIG. 14;

FIG. 16 is a diagram depicting the redirection setting screen continued from FIG. 15;

FIG. 17 is a diagram depicting an example of a registered domain name deletion screen;

FIG. 18 is a diagram depicting the registered domain name deletion screen continued from FIG. 17;

FIG. 19 is a diagram depicting the registered domain name deletion screen continued from FIG. 18;

FIG. 23 is a diagram depicting a registration item display screen and a process continuation screen continued from FIG. 22;

FIG. 26 is a diagram depicting a website establishment screen continued from FIG. 25;

FIG. 27 is a diagram depicting the website establishment screen continued from FIG. 26;

BEST MODE FOR CARRYING OUT THE INVENTION

Figure 1:
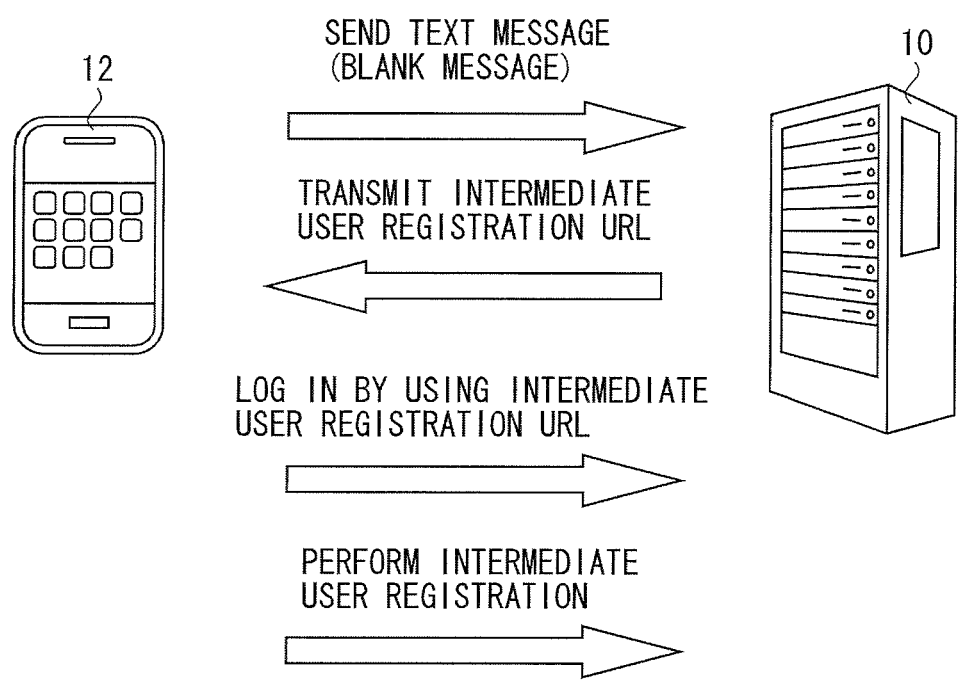
FIG. 1 is a conceptual diagram of a registration procedure of an intermediate user mobile telephone.
Figure 2:
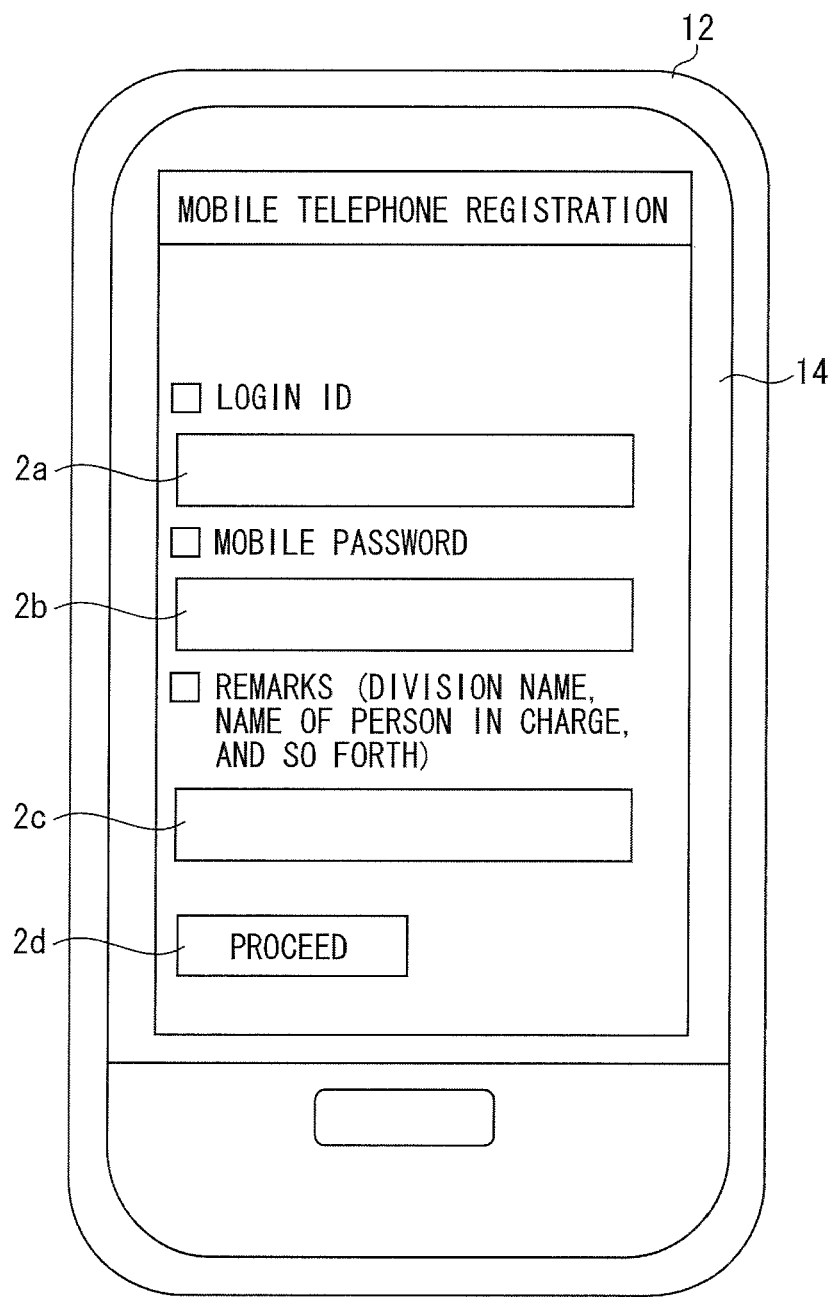
FIG. 2 is a diagram depicting an example of a registration process screen of the intermediate user mobile telephone.
Figure 3:
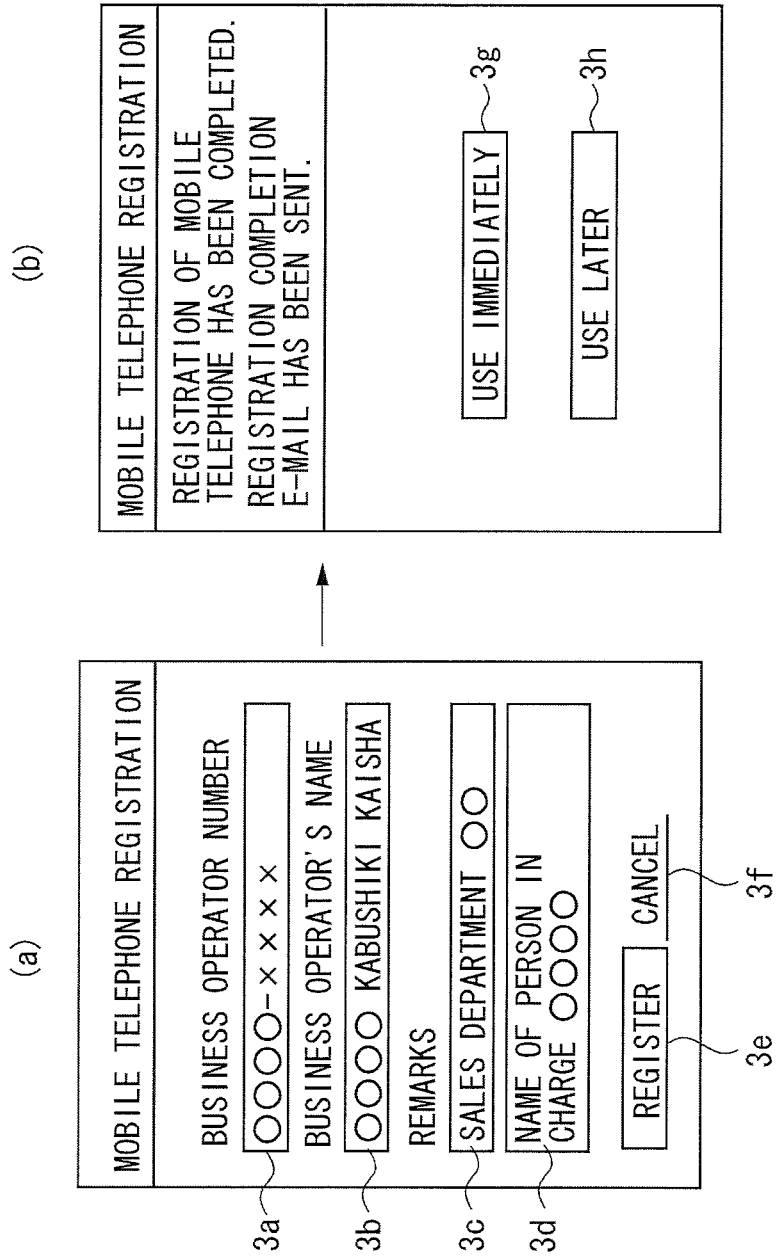
FIG. 3 is a diagram depicting a registration item display screen and a process continuation screen continued from FIG. 2.

With reference to the attached drawings such as FIG. 1 which is a conceptual diagram of a registration procedure of an intermediate user mobile telephone 12 depicted as an example, the details of a website creation system according to the present invention will be described as follows. Incidentally, FIG. 2 is a diagram depicting an example of a registration process screen of the intermediate user mobile telephone 12, and FIG. 3 is a diagram depicting a registration item display screen and a process continuation screen continued from FIG. 2. In FIGS. 1 to 3, a registration procedure of the intermediate user mobile telephone 12 in a first computer 10 is depicted. In FIG. 1, only one mobile telephone 12 is depicted, but a plurality of mobile telephones 12 are present in an actual system, and text messages are sent and received between the mobile telephones 12 and the first computer 10. In FIGS. 2 and 3, data which is displayed in entry areas and display areas is not depicted.

The website creation system establishes various websites and creates various web pages of the websites which the system established. The website creation system is formed of the first computer 10 (a server) (refer to FIG. 1) that is installed by a system operator and performs registration of a domain name and charges a registration fee, a second computer 11 (a server) (refer to FIG. 21) that is installed by the system operator or a designated business operator commissioned by the system operator and establishes a website and creates a web page, a plurality of intermediate user mobile telephones 12 (refer to FIG. 1) held by intermediate users, and a plurality of end user mobile telephones 13 (refer to FIG. 39) owned by end users.

The system operator has the authority to give a domain name and prevents unauthorized setting and use of the domain name by managing the domain name appropriately. The designated business operator conducts a business operation to introduce the system to end users. The intermediate users are employees of the designated business operator and have the authority to establish websites for introducing products and service of a plurality of end users. The end users are customers who use the system and can create particular websites for introducing their products and service.

Some examples of the intermediate users are an administrator of the system and a sales representative of the designated business operator, the sales representative who sells a mechanism of the system to an end user, but the intermediate users are not limited to the administrator and the sales representative and include all intermediate users related to the system. Some examples of the end users are a shop owner and an employee of a shop who pass on information on a product and service by using a web page of a website, but the end users are not limited to the shop owner and the employee and include all customers who use a web page of a website which is created in the system.

The first and second computers 10 and 11 each include a central processing section (a CPU or an MPU) and a memory and have a DNS server function, a database server function, a web server function, and a mail server function. These computers 10 and 11 each have a built-in large-capacity hard disk, and, to the computers 10 and 11, input devices (not shown) such as a keyboard and a mouse, output devices (not shown) such as a display and a printer are connected via an interface. These computers 10 and 11 can connect to the Internet and, by using the Internet, can access and log in to other servers and publicize various information through the Internet. Moreover, the mail server function makes it possible to receive a text message from a mobile telephone and send a text message to the mobile telephone. In the hard disks of these computers 10 and 11, a plurality of login IDs and a plurality of mobile passwords, which will be described later, and business operator numbers, business operators' names, and departments and sections corresponding to the login IDs and the mobile passwords are stored.

The central processing section of the first computer 10 launches an application stored in the memory based on control by an operating system and carries out the following units in accordance with the launched application. The central processing section carries out an e-mail sending first requesting unit that makes the intermediate user mobile telephones 12 of a plurality of intermediate users send text messages to a predetermined e-mail address and carries out an e-mail address first registering unit that registers the e-mail addresses of the intermediate user mobile telephones 12. The central processing section carries out a URL first transmitting unit that transmits, to the intermediate user mobile telephones 12, intermediate user registration URLs corresponding to the e-mail addresses of the intermediate user mobile telephones 12 by using the e-mail addresses of the intermediate users.

The central processing section of the first computer 10 carries out a domain name registering unit that registers a plurality of domain names applied for from the intermediate user mobile telephones 12 that have logged in to the system and, when the domain names are registered by the domain name registering unit, carries out a domain name charging unit that charges at least either the intermediate user mobile telephones 12 or the end user mobile telephones for the domain names. The central processing section carries out a registered domain name displaying unit that displays the plurality of domain names that are already registered via the domain name registering unit on the intermediate user mobile telephones 12 that have logged in to the system, and carries out a registered domain name deleting unit that deletes any one of the plurality of registered domain names in the intermediate user mobile telephones 12 that have logged in to the system.

The central processing section of the second computer 11 launches an application stored in the memory based on control by an operating system and carries out the following units in accordance with the launched application. The central processing section carries out a website establishing unit that establishes, by using the intermediate user mobile telephones 12 that have logged in to the system, a plurality of websites corresponding to the domain names registered in advance. In the website establishing unit, posting e-mail addresses and identifiers transmitted from the intermediate user mobile telephones 12 that have logged in to the system by using the intermediate user registration URLs are registered. The central processing section carries out a web page first creating unit that creates web pages of the websites corresponding to the domain names by using the text messages sent from the intermediate user mobile telephones 12 that have logged in to the system.

The central processing section of the second computer 11 carries out a web page first editing unit that edits the web pages of the websites corresponding to the domain names by using the text messages sent from the intermediate user mobile telephones 12 that have logged in to the system, and carries out a web page first deleting unit that deletes a web page to be deleted of a website corresponding to each domain name according to a web page deletion request transmitted from the intermediate user mobile telephones 12 that have logged in to the system.

The central processing section of the second computer 11 carries out an access destination transferring unit that transfers, when the intermediate user mobile telephones 12 access a particular domain name, an access destination to another URL which is different from the domain name. The central processing section carries out a website first outputting unit that outputs, through the Internet, the website including the web page created by the web page first creating unit. In the website first outputting unit, the website including the edited web page is output through the Internet.

The central processing section of the second computer 11 carries out an e-mail sending second requesting unit that makes the end user mobile telephones 13 of the plurality of end users send text messages to a posting e-mail address, and carries out an e-mail address second registering unit that registers the e-mail addresses of the end user mobile telephones 13. The central processing section carries out a URL second transmitting unit that transmits, to the end user mobile telephones 13, end user registration URLs corresponding to the e-mail addresses of the end user mobile telephones 13 by using the e-mail addresses of the end users, and carries out an end user registering unit that registers an end user who satisfies a predetermined condition in the system. The central processing section carries out a user registration deleting unit that deletes, by using the intermediate user mobile telephone 12, the registration of the end user registered by the end user registering unit.

The central processing section of the second computer 11 carries out a web page second creating unit that creates, by using the text messages sent from the end user mobile telephones 13 that have logged in to the system by using the end user registration URLs, a web page of a website corresponding to the domain name of a particular end user and established by the website establishing unit. The central processing section carries out a web page second editing unit that edits, by using the text messages sent from the end user mobile telephones 13 that have logged in to the system, a web page of a website corresponding to the domain name of a particular end user and established by the web page establishing unit.

The central processing section of the second computer 11 carries out a web page second deleting unit that deletes, according to a web page deletion request transmitted from the end user mobile telephones 13 that have logged in to the system, a web page to be deleted of a website corresponding to the domain name of a particular end user and established by the website establishing unit. The central processing section carries out a website second outputting unit that outputs, through the Internet, the website including the web page created by the web page second creating unit. In the website second outputting unit, the website including the edited web page is output through the Internet. Incidentally, it is also possible to make the first computer 10 carry out the above-described units that the second computer 11 carries out.

The intermediate user mobile telephone 12 and the end user mobile telephone 13 each have a built-in computer (not shown) provided with a central processing section (a CPU or an MPU) and a memory. The mobile telephones 12 and 13 execute a memory function, a DNS server function, a database server function, a web server function, and a mobile e-mail server function via the built-in computer. The mobile telephones 12 and 13 can connect to the Internet and can access and log in to the first and second computers 10 and 11 (the system) by using the Internet.

Based on FIGS. 1 to 3, a procedure for registering the intermediate user mobile telephone 12 in the first computer 10 will be described as follows. Incidentally, it is only necessary to register the intermediate user mobile telephone 12 in the system just one time if the intermediate user mobile telephone 12 is one and the same mobile telephone, and there is no need to perform a registration process more than once. The computer 10 makes the intermediate user mobile telephone 12 send a text message (a blank message) to a predetermined e-mail address (an address of the mobile e-mail server of the first computer 10) (e-mail sending first requesting unit). The intermediate user sends a text message (a blank message) to a designated e-mail address from the intermediate user mobile telephone 12. To the computer 10, an e-mail address of the intermediate user mobile telephone 12 and an intermediate user mobile telephone identification number that identifies the intermediate user mobile telephone 12 are transmitted.

When the text messages are sent from the intermediate user mobile telephones 12 to the computer 10, the first computer 10 registers (stores) the e-mail addresses of the intermediate user mobile telephones 12 in the hard disk and registers (stores) the intermediate user mobile telephone identification numbers of the intermediate user mobile telephones 12 in the hard disk (e-mail address first registering unit). The computer 10 stores the e-mail addresses of the intermediate user mobile telephones 12 in the hard disk in a state in which the e-mail addresses are associated with the intermediate user mobile telephone identification numbers.

After storing the e-mail addresses and the intermediate user mobile telephone identification numbers of the intermediate user mobile telephones 12 in the hard disk, the first computer 10 generates intermediate user registration URLs (URLs for logging in to the first computer) corresponding to the e-mail addresses of the intermediate user mobile telephones 12 and stores the generated intermediate user registration URLs in the hard disk in a state in which the generated intermediate user registration URLs are associated with the e-mail addresses and the intermediate user mobile telephone identification numbers of the intermediate user mobile telephones 12. After storing the intermediate user registration URLs in the hard disk, the computer 10 transmits the generated intermediate user registration URLs to the intermediate user mobile telephones 12 by using the e-mail addresses of the intermediate user mobile telephones 12 (URL first transmitting unit).

To the intermediate user mobile telephone 12 that sent the text message, a text message displaying the intermediate user registration URL is sent from the computer 10. The intermediate user who received the intermediate user registration URL can log in to the first computer 10 (the system) by clicking the intermediate user registration URL displayed on a display 14. When the URL displayed on the display 14 of the intermediate user mobile telephone 12 is clicked, the intermediate user mobile telephone 12 logs in to the computer 10 (the system), and a mobile telephone registration screen depicted in FIG. 2 is displayed on the display 14 of the mobile telephone 12.

On the mobile telephone registration screen of FIG. 2, a login ID entry area 2*a*, a mobile password entry area 2*b*, a remarks entry area 2*c*, and a PROCEED button 2*d* are displayed. After entering an arbitrary login ID in the login ID entry area 2*a*, an arbitrary password in the mobile password entry area 2*b*, and remarks in the remarks entry area 2*c* if necessary, the intermediate user clicks the PRO- CEED button 2d. In the remarks entry area 2c, a division name, an intermediate user's name (for example, the name of an administrator or a sales representative), and the like are entered.

When the registration data is entered in the entry areas 2a to 2c and the PROCEED button 2d is clicked, the registration data entered in the entry areas 2a to 2c is transmitted to the computer 10. The first computer 10 applies the transmitted login ID and mobile password to the login ID and the mobile password that are stored in the hard disk, retrieves the business operator number and the business operator's name corresponding to the appropriate login ID and mobile password from the hard disk, and transmits the retrieved business operator number and business operator's name and the entered division name and intermediate user's name to the intermediate user mobile telephone 12.

On the display 14 of the intermediate user mobile telephone 12, as depicted in FIG. 3(a), a registration item display screen is displayed. On the registration item display screen, a business operator number display area 3a in which the business operator number is displayed, a business operator's name display area 3b in which the business operator's name is displayed, a division name display area 3c in which the division name is displayed, an intermediate user's name display area 3d in which the name of an intermediate user is displayed, a registration button 3e, and a cancel button 3f are displayed. When the cancel button 3f is clicked, log-out of the system is performed.

The intermediate user checks the business operator number, the business operator's name, the division name, and the name of the intermediate user which are displayed in the display areas, and, if there is no change or the like, the intermediate user clicks the registration button 3e. When the registration button 3e is clicked, a user data registration signal is transmitted from the intermediate user mobile telephone 12 to the computer 10. The first computer 10 stores the business operator number, the business operator's name, the department and section, the division name, and the name of the intermediate user in the hard disk in a state in which the business operator number, the business operator's name, the department and section, the division name, and the name of the intermediate user are associated with the intermediate user mobile telephone identification number (intermediate user data storing unit). After storing them, the computer 10 displays a process continuation screen for continuing a subsequent process, the process continuation screen depicted in FIG. 3(b), on the display 14 of the intermediate user mobile telephone 12.

On the process continuation screen of FIG. 3(b), a mobile telephone 12 registration completion message, a registration completion e-mail sending message, a USE IMMEDIATELY button 3g, and a USE LATER button 3h are displayed. When the process is temporarily ended, the USE LATER button 3h is clicked. When the USE LATER button 3h is clicked, log-out of the system is performed. When the process is continuously performed, the USE IMMEDIATELY button 3g is clicked.

Figure 4:
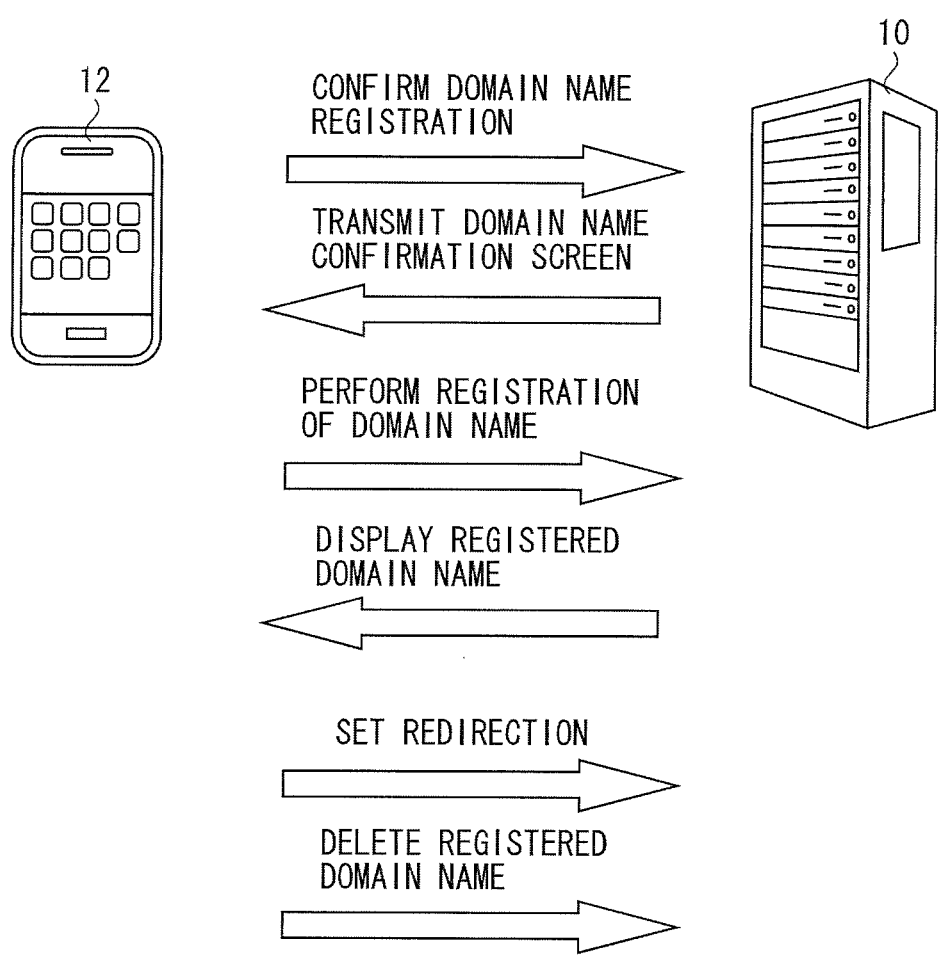
FIG. 4 is a conceptual diagram of a domain name registration procedure.
Figure 5:
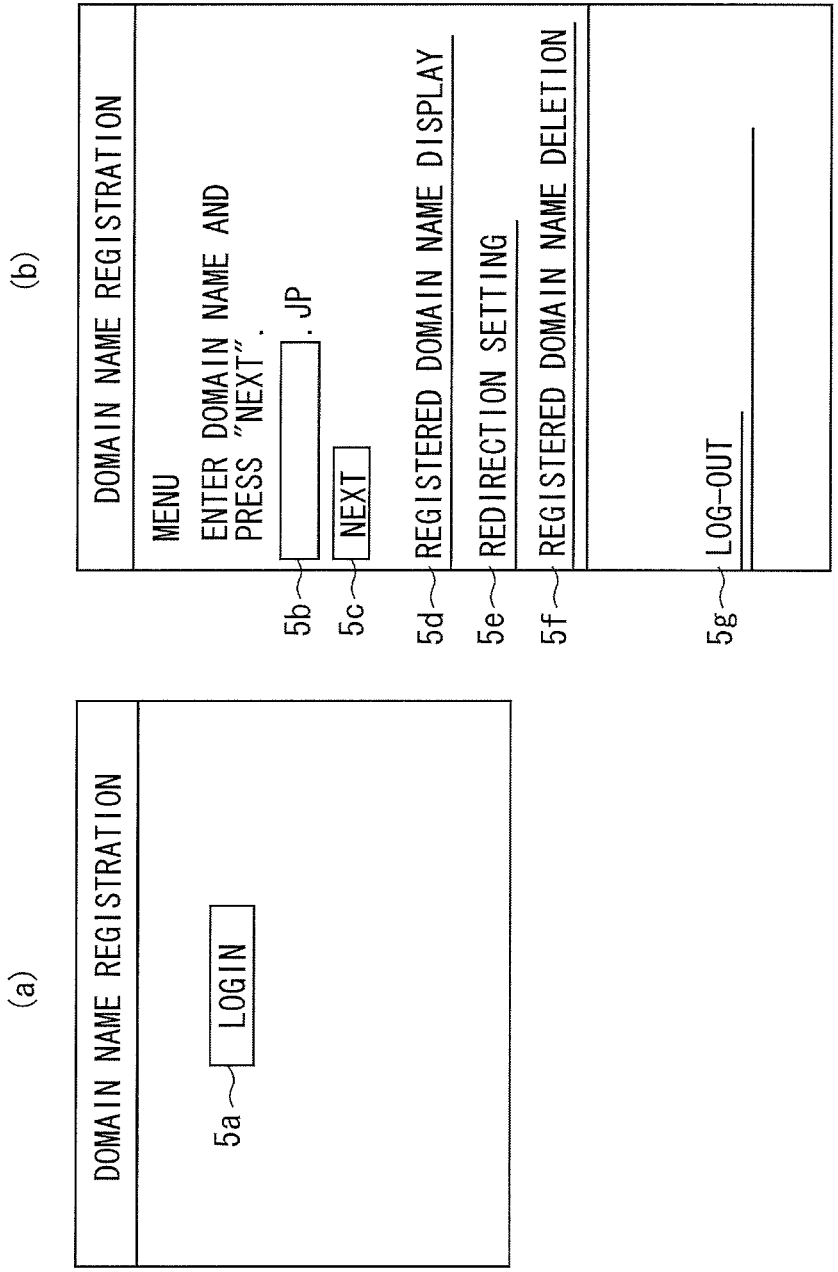
FIG. 5 is a diagram depicting an example of a domain name registration screen.
Figure 6:
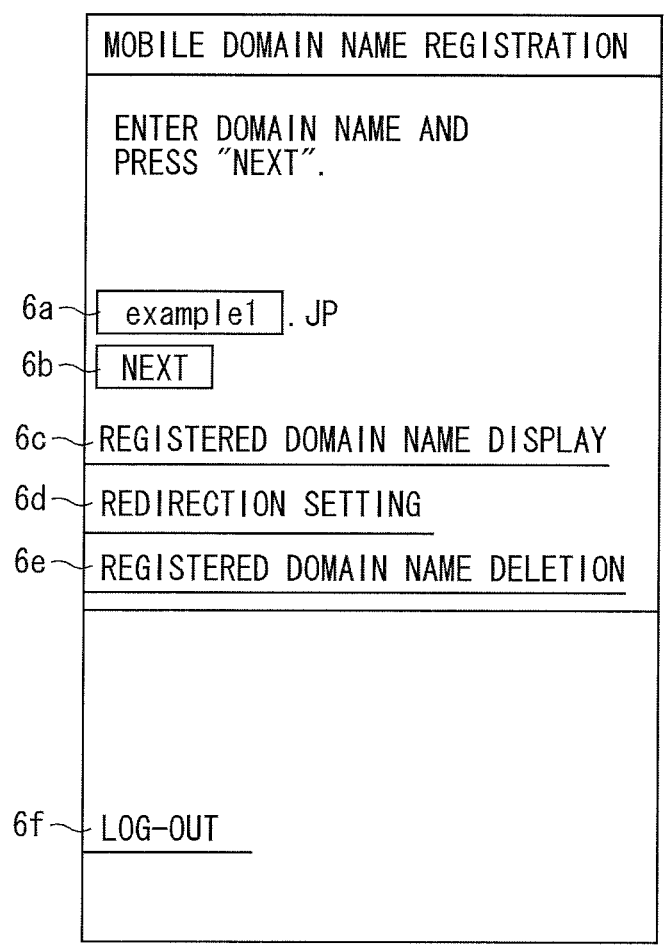
FIG. 6 is a diagram depicting the domain name registration screen continued from FIG. 5.
Figure 7:
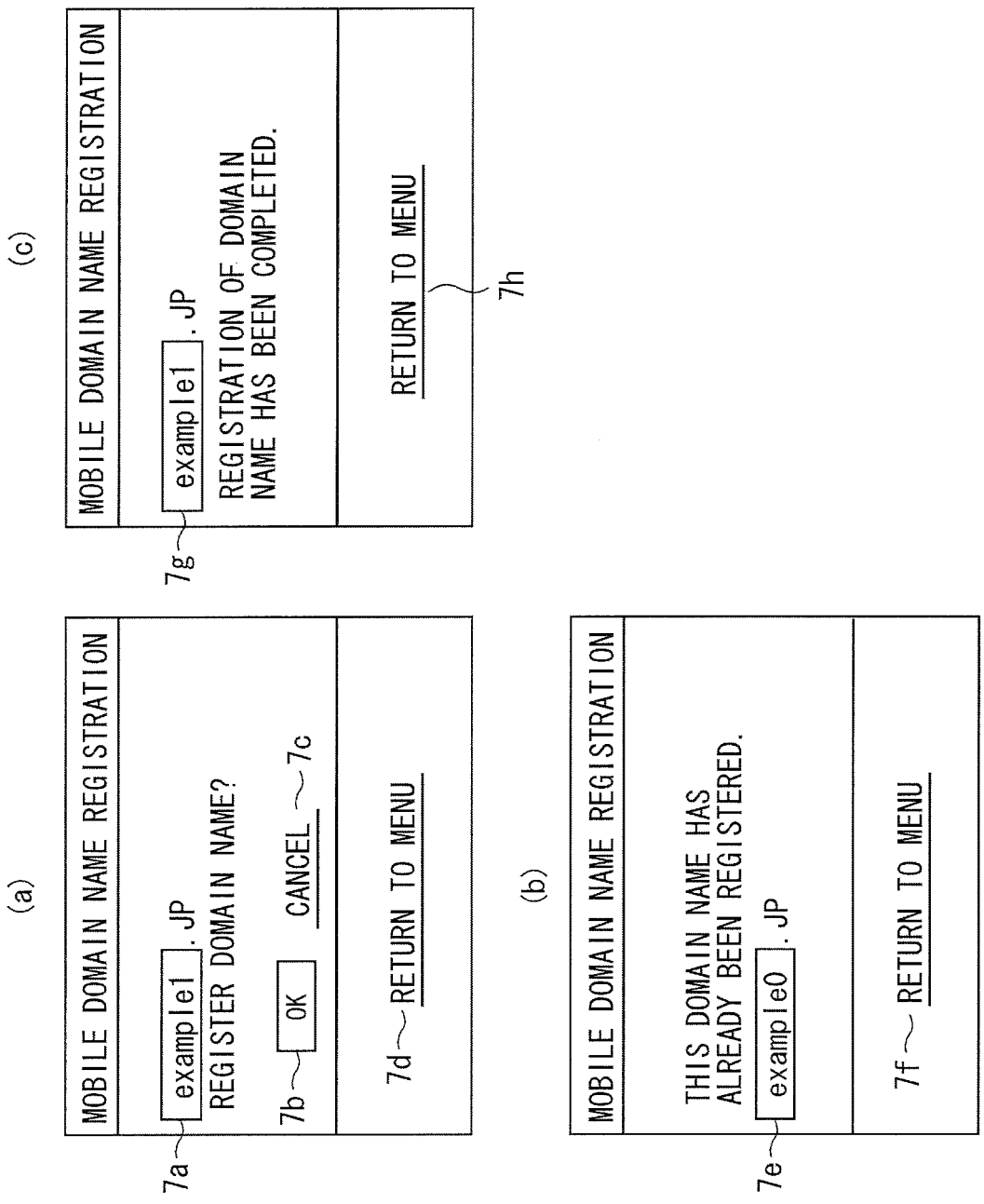
FIG. 7 is a diagram depicting the domain name registration screen continued from FIG. 6.

FIG. 4 is a conceptual diagram of a domain name registration procedure depicted as an example, and FIG. 5 is a diagram depicting an example of a domain name registration screen. FIG. 6 is a diagram depicting the domain name registration screen continued from FIG. 5, and FIG. 7 is a diagram depicting the domain name registration screen continued from FIG. 6. In FIGS. 5 to 7, data which is displayed in entry areas and display areas is not depicted.

When the USE IMMEDIATELY button 3g is clicked on the process continuation screen of FIG. 3(b), the first computer 10 displays a domain name registration screen depicted in FIG. 5(a) on the display 14 of the intermediate user mobile telephone 12. Incidentally, to log in to the first computer 10 (the system) again after the USE LATER button 3h is clicked, after an intermediate user registration URL for logging in to the first computer is entered in the intermediate user mobile telephone 12, a login button is clicked. When the login button is clicked, the computer 10 displays the domain name registration screen depicted in FIG. 5(a) on the display 14 of the intermediate user mobile telephone 12. On the domain name registration screen depicted in FIG. 5(a), a login button 5a is displayed.

When the login button 5a is clicked on the domain name registration screen depicted in FIG. 5(a), the first computer 10 displays a domain name registration screen of FIG. 5(b) on the display 14 of the intermediate user mobile telephone 12. On the domain name registration screen of FIG. 5(b), a domain name entry area 5b, a NEXT button 5c, a registered domain name display button 5d, a redirection setting button 5e, a registered domain name deletion button 5f, and a log-out button 5g are displayed. When the log-out button 5g is clicked, log-out of the computer 10 (the system) is performed. To register a domain name, on the domain name registration screen of FIG. 5(b), after an arbitrary domain name is entered in the domain name entry area 5b, the NEXT button 5c is clicked.

When the NEXT button 5c is clicked, the first computer 10 displays a domain name registration screen of FIG. 6 on the display 14 of the intermediate user mobile telephone 12. In a domain name display area 6a of the domain name registration screen of FIG. 6, an entered domain name is displayed. After checking the domain name displayed in the domain name display area 6a, the intermediate user clicks a NEXT button 6b. Incidentally, when the entered domain name is not registered, a log-out button 6f is clicked. When the log-out button 6f is clicked, log-out of the system is performed.

After the domain name is checked on the domain name registration screen of FIG. 6, when the NEXT button 6b is clicked, the first computer 10 displays a domain name registration screen depicted in FIG. 7(a) or FIG. 7(b) on the display 14 of the intermediate user mobile telephone 12. The domain name registration screen of FIG. 7(a) is displayed if there is no redundant domain name and the domain name can be registered. The domain name registration screen of FIG. 7(b) is displayed if there is already a redundant domain name and the domain name cannot be registered.

When the same domain name is not present in the hard disk, the first computer 10 displays the domain name registration screen of FIG. 7(a) on the display 14 of the intermediate user mobile telephone 12. On the domain name registration screen of FIG. 7(a), a domain name display area 7a in which the entered domain name is displayed, a domain name registration message, an OK button 7b, a cancel button 7c, and a RETURN TO MENU button 7d are displayed. When the same domain name is already stored in the hard disk, the computer 10 displays the domain name registration screen of FIG. 7(b) on the display 14 of the intermediate user mobile telephone 12. On the domain name registration screen of FIG. 7(b), a message saying that the domain name is used (registered), a domain name display area 7e in which the entered domain name is displayed, and a RETURN TO MENU button 7f are displayed. When the RETURN TO MENU button 7f is clicked on the domain name registration screen of FIG. 7(b), the computer 10 displays the domain name registration screen of FIG. 5(b) on the display 14 of the intermediate user mobile telephone 12.

The intermediate user checks the domain name displayed in the domain name display area 7*a*, and, if there is no change or the like in the domain name and the intermediate user registers the domain name, the intermediate user clicks the OK button 7*b* of the domain name registration screen of FIG. 7(*a*). Incidentally, when the cancel button 7*c* is clicked, the first computer 10 displays the domain name registration screen of FIG. 5(*b*) on the display 14 of the intermediate user mobile telephone 12 without registering the domain name. Moreover, when the RETURN TO MENU button 7*d* is clicked, the computer 10 displays the domain name registration screen of FIG. 5(*b*) on the display 14 of the intermediate user mobile telephone 12 without registering the domain name. After the cancel button 7*c* or the RETURN TO MENU button 7*d* or 7*f* is clicked, a domain name registration process is restarted from the beginning.

When the OK button 7*b* is clicked on the domain name registration screen of FIG. 7(*a*), a domain name registration signal is transmitted from the intermediate user mobile telephone 12 to the computer 10. The first computer 10 registers (stores) a domain name to be registered in the hard disk in a state in which the domain name to be registered is associated with the intermediate user mobile telephone identification number (domain name registering unit). After storing the domain name, the computer 10 displays a domain name registration screen of FIG. 7(*c*) on the display 14 of the intermediate user mobile telephone 12. On the domain name registration screen of FIG. 7(*c*), a domain name display area 7*g* in which the registered domain name is displayed, a domain name registration completion message, and a RETURN TO MENU button 7*h* are displayed. When the RETURN TO MENU button 7*h* is clicked on the domain name registration screen of FIG. 7(*c*), the computer 10 displays the domain name registration screen of FIG. 5(*b*) on the display 14 of the intermediate user mobile telephone 12.

The intermediate user can register a plurality of domain names in the first computer 10 (the system) on the domain name registration screen of FIG. 5(*b*). When the domain name is registered, the intermediate user mobile telephone 12 is charged for a registration fee for the registered domain name (domain name charging unit). The registration fee has to be paid every time one domain name is registered. The registration fee for the domain name, the registration fee charged to the mobile telephone 12, is added to a charge for use of the mobile telephone 12. The website creation system can collect the registration fee of the domain name from the mobile telephone 12 by charging the intermediate user mobile telephone 12 for the registration fee of the domain name for registration of the domain name, can reliably manage the domain name while using the collected registration fee of the domain name, and can prevent improper use of the domain name.

Figure 8:
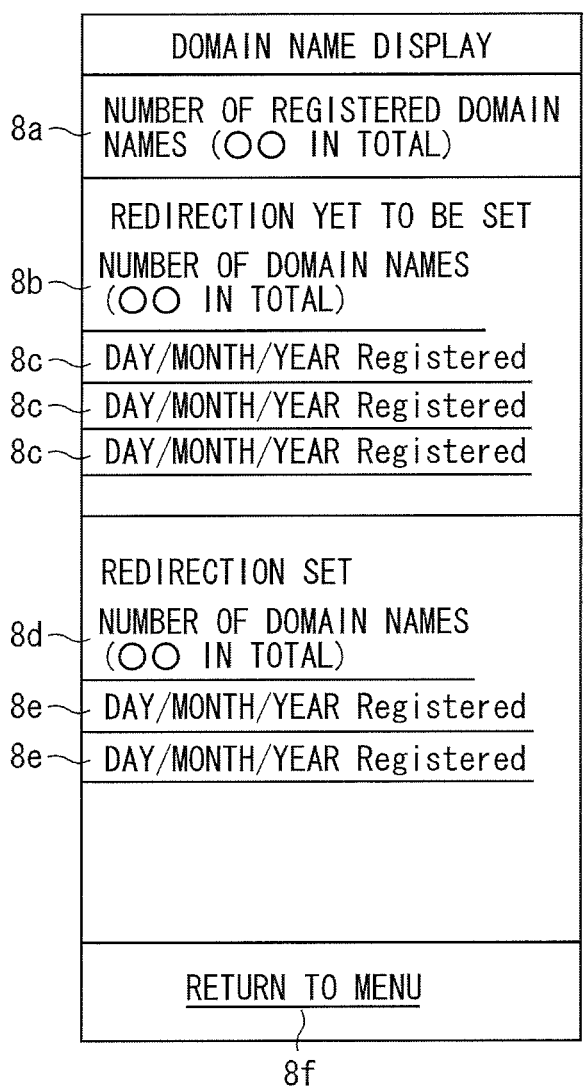
FIG. 8 is a diagram depicting an example of a domain name display screen.

FIG. 8 is a diagram depicting an example of a domain name display screen, and FIG. 9 is a diagram depicting an example of a redirection yet-to-be-set domain name display screen. FIG. 10 is a diagram depicting an example of a redirection yet-to-be-set domain name individual display screen. In FIGS. 8 to 10, data which is displayed in entry areas and display areas is not depicted.

When a registered domain name display button 5*d* is clicked on the domain name registration screen of FIG. 5(*b*), a registered domain name display signal is transmitted from the intermediate user mobile telephone 12 to the computer 10. After extracting, from the hard disk, all the registered domain names corresponding to the intermediate user mobile telephone identification number of the intermediate user mobile telephone 12 that transmitted the registered domain name display signal, the first computer 10 displays a domain name display screen depicted in FIG. 8 on the display 14 of the intermediate user mobile telephone 12.

On the domain name display screen of FIG. 8, a registered domain name number display area 8*a* in which the number of registered domain names is displayed, a redirection yet-to-be-set domain name number display area 8*b* in which the number of domain names whose redirection, which will be described later, is yet to be set, a redirection yet-to-be-set domain name registration date display area 8*c* in which the registration date of each redirection yet-to-be-set domain name is displayed, a redirection set domain name number display area 8*d* in which the number of redirection set domain names is displayed, a direct set domain name registration date display area 8*e* in which the registration date of each redirection set domain name is displayed, and a RETURN TO MENU button 8*f* are displayed. The website creation system can check the registered domain names and can prevent in advance an application for the same domain name. Moreover, it is possible to know the domain name trend and thereby determine an optimum domain name.

When the redirection yet-to-be-set domain name number display area 8*b* is clicked on the domain name display screen of FIG. 8, the first computer 10 displays a redirection yet-to-be-set domain name display screen depicted in FIG. 9 on the display 14 of the intermediate user mobile telephone 12. On the redirection yet-to-be-set domain name display screen, the details of all the redirection yet-to-be-set domain names are displayed. On the redirection yet-to-be-set domain name display screen, a redirection yet-to-be-set domain name display area 9*a* in which the domain name, the registered company name, the department and section, the name of the person in charge, and the registration date are displayed, a RETURN button 9*b*, and a RETURN TO MENU button 9*c* are displayed. When the RETURN button 9*b* is clicked, the screen returns to the domain name display screen of FIG. 8.

When any one of the redirection yet-to-be-set domain name registration display areas 9*a* is clicked on the redirection yet-to-be-set domain name display screen of FIG. 9, the first computer 10 displays a redirection yet-to-be-set domain name individual display screen depicted in FIG. 10 on the display 14 of the intermediate user mobile telephone 12. On the redirection yet-to-be-set domain name individual display screen, the details of an individually designated direct yet-to-be-set domain name are displayed. On the redirection yet-to-be-set domain name individual display screen, a redirection yet-to-be-set domain name individual display area 10*a* in which the domain name, the registered company name, the department and section, the name of the person in charge, and the registration date are displayed, a RETURN button 10*b*, a NEXT button 10*c*, and a RETURN TO MENU button 10*d* are displayed. When the RETURN button 10*b* is clicked, the screen returns to the domain name display screen of FIG. 8. When the NEXT button 10*c* is clicked, the details of the next direct yet-to-be-set domain name are displayed.

FIG. 11 is a diagram depicting an example of redirection set domain name display screen, and FIG. 12 is a diagram depicting an example of a redirection set domain name individual display screen. In FIGS. 11 and 12, data which is displayed in entry areas and display areas is not depicted. When the redirection set domain name number display area 8*d* is clicked on the domain name display screen of FIG. 8, the first computer 10 displays the redirection set domain name display screen depicted in FIG. 11 on the display 14 of the intermediate user mobile telephone 12. On the redirection set domain name display screen, the details of all the redirection set domain names are displayed. On the redirection set domain name display screen, a redirection set domain name display area 11a in which the domain name, the registered company name, the department and section, the name of the person in charge, and the registration date are displayed, a RETURN button 11b, and a RETURN TO MENU button 11c are displayed. When the RETURN button 11b is clicked, the screen returns to the domain name display screen of FIG. 8.

When any one of the redirection set domain name display area 11a in the redirection set domain name display screen of FIG. 11 is clicked, the first computer 10 displays the redirection set domain name individual display screen depicted in FIG. 12 on the display 14 of the intermediate user mobile telephone 12. On the redirection set domain name individual display screen, the details of an individually designated direct set domain name are displayed. On the redirection set domain name individual display screen, a redirection set domain name individual display area 12a in which the domain name, the registered company name, the department and section, the name of the person in charge, and the registration date are displayed, a RETURN button 12b, a NEXT button 12c, and a RETURN TO MENU button 12d are displayed. When the RETURN button 12b is clicked, the screen returns to the domain name display screen of FIG. 8. When the NEXT button 12c is clicked, the details of the next direct set domain name are displayed.

FIG. 13 is a diagram depicting an example of a redirection setting screen, and FIG. 14 is a diagram depicting the redirection setting screen continued from FIG. 13. FIG. 15 is a diagram depicting the redirection setting screen continued from FIG. 14, and FIG. 16 is a diagram depicting the redirection setting screen continued from FIG. 15. In FIGS. 13 to 16, data which is displayed in entry areas and display areas is not depicted.

When the redirection setting button 5e is clicked on the domain name registration screen of FIG. 5(b), a redirection setting signal is transmitted from the intermediate user mobile telephone 12 to the computer 10. The first computer 10 displays the redirection setting screen depicted in FIG. 13 on the display 14 of the intermediate user mobile telephone 12 that transmitted the redirection setting signal. On the redirection setting screen of FIG. 13, a domain name entry message, a domain name entry area 13a in which a setting-target domain name on which redirection is to be set is entered, a NEXT button 13b, and a RETURN TO MENU button 13c are displayed.

After entering a domain name in the domain name entry area 13a by using the intermediate user mobile telephone 12, the intermediate user clicks the NEXT button 13b. When the NEXT button 13b is clicked, the first computer 10 determines whether or not the entered domain name is stored in the hard disk, and, if the domain name is already stored in the hard disk, the first computer 10 displays the redirection setting screen depicted in FIG. 14 on the display 14 of the intermediate user mobile telephone 12. If the domain name is not stored in the hard disk, though not depicted in the drawing, the computer 10 displays an error message on the display 14 of the intermediate user mobile telephone 12.

On the redirection setting screen of FIG. 14, a domain name display area 14a in which the domain name entered on the redirection setting screen of FIG. 13 is displayed, a redirection destination URL entry message, a redirection destination URL entry area 14b, a NEXT button 14c, a cancel button 14d, and a RETURN TO MENU button 14e are displayed. In the domain name display area 14a, in addition to the domain name, the department and section, the name of the person in charge, and the registration date are displayed. When the cancel button 14d is clicked, the screen returns to the redirection setting screen of FIG. 13.

After entering a redirection destination URL in the redirection destination URL entry area 14b by using the intermediate user mobile telephone 12, the intermediate user clicks the NEXT button 14c. When the NEXT button 14c is clicked, the first computer 10 displays the redirection setting screen depicted in FIG. 15 on the display 14 of the intermediate user mobile telephone 12. On the redirection setting screen of FIG. 15, a domain name display area 15a in which the domain name entered on the redirection setting screen of FIG. 13 is displayed, a redirection setting message, a redirection destination URL display area 15b in which the redirection destination URL entered on the redirection setting screen of FIG. 14 is displayed, a setting button 15c, a cancel button 15d, and a RETURN TO MENU button 15e are displayed. In the domain name display area 15a, in addition to the domain name, the department and section, the name of the person in charge, and the registration date are displayed. When the cancel button 15d is clicked, the screen returns to the redirection setting screen of FIG. 13.

After checking the setting-target domain name and the redirection destination URL, when the intermediate user sets redirection, the intermediate user clicks the setting button 15c. When the setting button 15c is clicked, the first computer 10 stores the redirection destination URL in the hard disk in a state in which the redirection destination URL is associated with the intermediate user mobile telephone identification number, and stores the setting-target domain name in the hard disk in a state in which the redirection destination URL is set on the setting-target domain name (access destination changing unit). After storing, in the hard disk, the redirection destination URL and the setting-target domain name on which the redirection destination URL is set, the computer 10 displays the redirection setting screen depicted in FIG. 16 on the display 14 of the intermediate user mobile telephone 12. On the redirection setting screen of FIG. 16, a domain name display area 16a in which the setting-target domain name is displayed, a redirection setting completion message, a redial destination URL display area 16b in which the redial destination URL is displayed, and a RETURN TO MENU button 16c are displayed.

Even when a website corresponding to the domain name is not established or a web page of a website corresponding to the domain name is not created, the website creation system can publicize an already created web page of an already established website through the Internet by changing the access destination to another URL. Moreover, when another website is already established, by changing the access destination to the URL of the other website, it is possible to use the other website which is already made while using the domain name and thereby save the effort of establishing a website again.

Figures 20, 21:
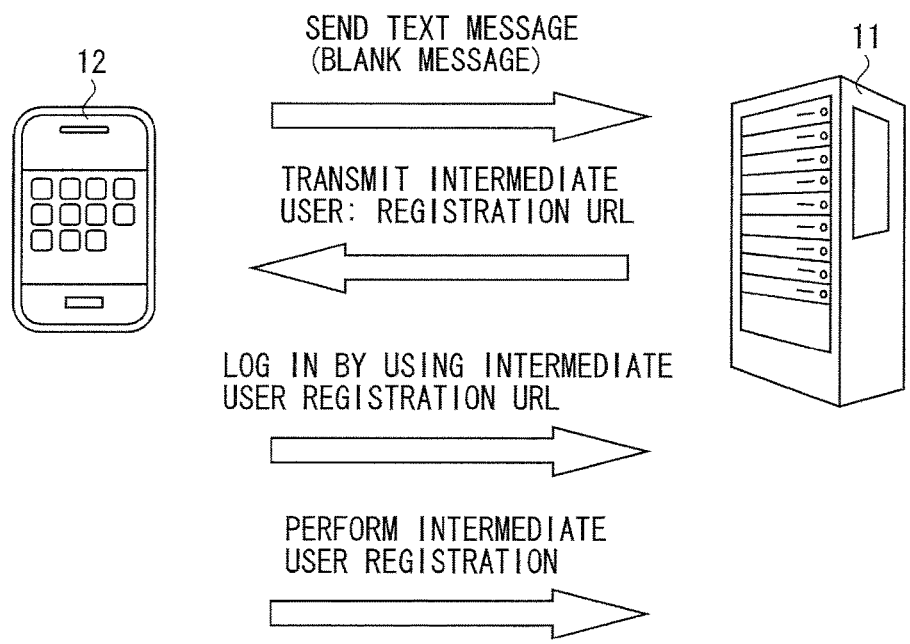
FIG. 20 is a diagram depicting the registered domain name deletion screen continued from FIG. 19.
FIG. 21 is a conceptual diagram depicting another example of the registration procedure of the intermediate user mobile telephone.

FIG. 17 is a diagram depicting an example of a registered domain name deletion screen, and FIG. 18 is a diagram depicting the registered domain name deletion screen continued from FIG. 17. FIG. 19 is a diagram depicting the registered domain name deletion screen continued from FIG. 18, and FIG. 20 is a diagram depicting the registered domain name deletion screen continued from FIG. 19. In FIGS. 17 to 20, data which is displayed in entry areas and display areas is not depicted.

When the registered domain name deletion button 5f is clicked on the domain name registration screen of FIG. 5(b), a registered domain name deletion signal is transmitted from the intermediate user mobile telephone 12 to the computer 10. The first computer 10 displays the registered domain name deletion screen depicted in FIG. 17 on the display 14 of the intermediate user mobile telephone 12 that transmitted the registered domain name deletion signal. On the registered domain name deletion screen of FIG. 17, a domain name-to-be-deleted entry message, a domain name entry area 17a in which a domain name to be deleted is entered, a NEXT button 17b, and a RETURN TO MENU button 17c are displayed.

After entering a domain name to be deleted in the domain name entry area 17a by using the intermediate user mobile telephone 12, the intermediate user clicks the NEXT button 17b. When the NEXT button 17b is clicked, the first computer 10 determines whether or not the entered domain name is stored in the hard disk, and, if the domain name is already stored in the hard disk, the first computer 10 displays the registered domain name deletion screen depicted in FIG. 18 on the display 14 of the intermediate user mobile telephone 12. If the domain name is not stored in the hard disk, though not depicted in the drawing, the computer 10 displays an error message on the display 14 of the intermediate user mobile telephone 12.

On the registered domain name deletion screen of FIG. 18, a domain name display area 18a in which the domain name entered on the registered domain name deletion screen of FIG. 17 is displayed, a registration deletion message, a NEXT button 18b, a cancel button 18c, and a RETURN TO MENU button 18d are displayed. In the domain name display area 18a, in addition to the domain name, the department and section, the name of the person in charge, and the registration date are displayed. When the cancel button 18c is clicked, the screen returns to the registered domain name deletion screen of FIG. 17.

After checking the domain name displayed in the domain name display area, the intermediate user clicks the NEXT button 18b. When the NEXT button 18b is clicked, the first computer 10 displays the registered domain name deletion screen depicted in FIG. 19 on the display 14 of the intermediate user mobile telephone 12. On the registered domain name deletion screen of FIG. 19, a domain name display area 19a in which the domain name entered on the registered domain name deletion screen of FIG. 17 is displayed, a domain name check and deletion message, a deletion button 19b, a cancel button 19c, and a RETURN TO MENU button 19d are displayed. In the domain name display area 19a, in addition to the domain name, the department and section, the name of the person in charge, and the registration date are displayed. When the cancel button 19c is clicked, the screen returns to the registered domain name deletion screen of FIG. 17.

After checking the domain name to be deleted again, the intermediate user clicks the deletion 19b when deleting the domain name. When the deletion button 19b is clicked, the first computer 10 sets an ending flag (including an ending date and time) on the domain name to be deleted of the domain names stored in the hard disk, and stores the domain name in the hard disk with the ending flag (registered domain name deleting unit). Alternatively, the first computer 10 erases the domain name from the hard disk (registered domain name deleting unit).

After storing the domain name to be deleted in the hard disk with the ending flag or erasing the domain name to be deleted from the hard disk, the first computer 10 displays the registered domain name deletion screen depicted in FIG. 20 on the display 14 of the intermediate user mobile telephone 12. On the registered domain name deletion screen of FIG. 20, a domain name display area 20a in which the deleted domain name is displayed, a registered domain name deletion completion message, and a RETURN TO MENU button 20b are displayed. In the domain name display area 20a, in addition to the domain name, the department and section, the name of the person in charge, and the registration date are displayed. Since the website creation system allows the intermediate user to delete an unnecessary domain name by using the intermediate user mobile telephone 12, it is possible to organize the domain names while deleting an unnecessary domain name via the intermediate user mobile telephone 12. Moreover, when a wrong domain name is registered, it is possible to delete the domain name.

Figure 22:
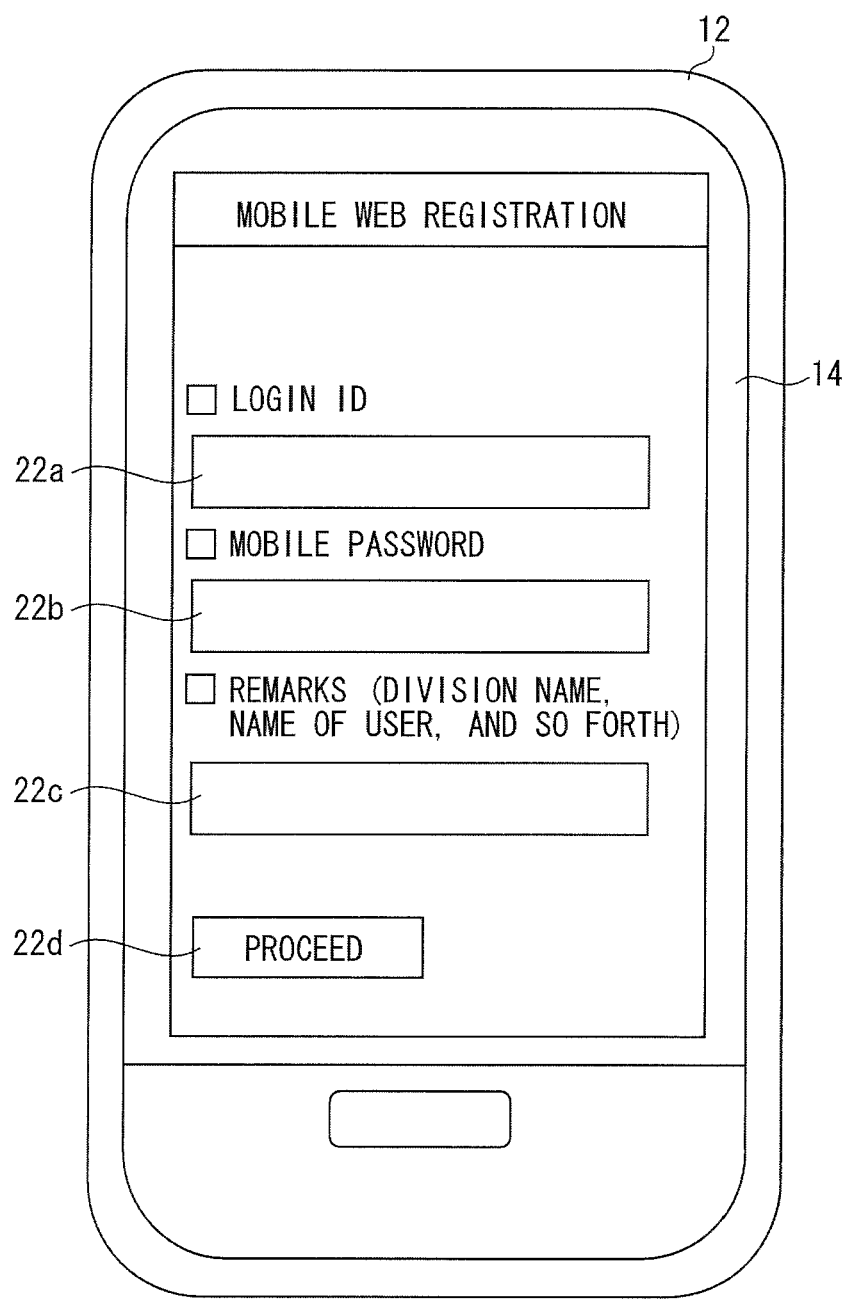
FIG. 22 is a diagram depicting another example of the registration process screen of the intermediate user mobile telephone.

FIG. 21 is a conceptual diagram depicting another example of the registration procedure of the intermediate user mobile telephone 12, and FIG. 22 is a diagram depicting another example of the registration process screen of the intermediate user mobile telephone 12. FIG. 23 is a diagram depicting a registration item display screen and a process continuation screen continued from FIG. 22. In FIGS. 21 to 23, the registration procedure of the intermediate user mobile telephone 12 in the second computer 11 is depicted. In FIG. 21, only one mobile telephone 12 is depicted, but a plurality of mobile telephones 12 are present in an actual system and text messages are sent and received between the mobile telephones 12 and the second computer 11. Incidentally, in FIGS. 22 and 23, data which is displayed in entry areas and display areas is not depicted.

Based on FIGS. 21 to 23, the registration procedure of the intermediate user mobile telephone 12 in the second computer 11 will be described as follows. Incidentally, it is only necessary to register the intermediate user mobile telephone 12 in the computer 11 (the system) just one time if the intermediate user mobile telephone 12 is one and the same mobile telephone 12, and there is no need to perform a registration process more than once. The computer 11 makes the intermediate user mobile telephone 12 send a text message (a blank message) to a predetermined e-mail address (an address of the mobile e-mail server of the second computer 11) (e-mail sending first requesting unit). The intermediate user sends a text message (a blank message) to a designated e-mail address from the intermediate user mobile telephone 12. To the computer 11, an e-mail address of the intermediate user mobile telephone 12 and an intermediate user mobile telephone identification number that identifies the intermediate user mobile telephone 12 are transmitted.

When the text messages are sent from the intermediate user mobile telephones 12 to the second computer 11, the computer 11 registers (stores) the e-mail addresses of the intermediate user mobile telephones 12 in the hard disk and registers (stores) the intermediate user mobile telephone identification numbers of the intermediate user mobile telephones 12 in the hard disk (e-mail address first registering unit). The computer 11 stores the e-mail addresses of the intermediate user mobile telephones 12 in the hard disk in a state in which the e-mail addresses are associated with the intermediate user mobile telephone identification numbers.

After storing the e-mail addresses and the intermediate user mobile telephone identification numbers of the intermediate user mobile telephones 12 in the hard disk, the second computer 11 generates intermediate user registration URLs (URLs for logging in to the second computer) corresponding to the e-mail addresses of the intermediate user mobile telephones 12 and stores the generated intermediate user registration URLs in the hard disk in a state in which the generated intermediate user registration URLs are associated with the e-mail addresses and the intermediate user mobile telephone identification numbers of the intermediate user mobile telephones 12. After storing the intermediate user registration URLs in the hard disk, the computer 11 transmits the generated intermediate user registration URLs to the intermediate user mobile telephones 12 by using the e-mail addresses of the intermediate user mobile telephones 12 (URL first transmitting unit).

To the intermediate user mobile telephone 12 that sent the text message, a text message displaying the intermediate user registration URL is sent from the second computer 11. The intermediate user who received the intermediate user registration URL can log in to the computer 11 (the system) by clicking the intermediate user registration URL displayed on the display 14. When the URL displayed on the display 14 of the intermediate user mobile telephone 12 is clicked, the intermediate user mobile telephone 12 logs in to the computer 11 (the system), and a registration screen of the mobile telephone 12, the registration screen depicted in FIG. 22, is displayed on the display 14 of the mobile telephone 12.

On the registration process screen of FIG. 22, a login ID entry area 22*a*, a mobile password entry area 22*b*, a remarks entry area 22*c*, and a PROCEED button 22*d* are displayed. After entering an arbitrary login ID in the login ID entry area 22*a*, an arbitrary password in the mobile password entry area 22*b*, and remarks in the remarks entry area 22*c* if necessary, the intermediate user clicks the PROCEED button 22*d*. In the remarks entry area 22*c*, a division name, an intermediate user's name (for example, the name of a sales representative or an administrator), and the like are entered.

When the registration data is entered in the entry areas 22*a* to 22*c* and the PROCEED button 22*d* is clicked, the data entered in the entry areas 22*a* to 22*c* is transmitted to the computer 11. The second computer 11 applies the transmitted login ID and mobile password to the login ID and the mobile password that are stored in the hard disk, retrieves the business operator number and the business operator's name corresponding to the appropriate login ID and mobile password from the hard disk, and transmits the retrieved business operator number and business operator's name and the entered division name and intermediate user's name to the intermediate user mobile telephone 12.

On the display 14 of the intermediate user mobile telephone 12, a registration item display screen depicted in FIG. 23(*a*) is displayed. On the registration item display screen, a business operator number display area 23*a* in which the business operator number is displayed, a business operator's name display area 23*b* in which the business operator's name is displayed, a division name display area 23*c* in which the division name is displayed, an intermediate user's name display area 23*d* in which the name of the intermediate user is displayed, a registration button 23*e*, and a cancel button 23*f* are displayed. When the cancel button 23*f* is clicked, log-out of the system is performed.

The intermediate user checks the business operator number, the business operator's name, the division name, and the name of the intermediate user which are in the display areas 23*a* to 23*d*, and, if there is no change or the like, the intermediate user clicks the registration button 23*e*. When the registration button 23*e* is clicked, a user data registration signal is transmitted from the intermediate user mobile telephone 12 to the computer 11. The second computer 11 stores the business operator number, the business operator's name, the department and section, the division name, and the name of the intermediate user in the hard disk in a state in which the business operator number, the business operator's name, the department and section, the division name, and the name of the intermediate user are associated with the intermediate user mobile telephone identification number (intermediate user data storing unit). After storing them, the computer 11 displays a process continuation screen for continuing a subsequent process, the process continuation screen depicted in FIG. 23(*b*), on the display 14 of the intermediate user mobile telephone 12.

On the process continuation screen of FIG. 23(*b*), a mobile telephone registration completion message, a registration completion e-mail sending message, a USE IMMEDIATELY button 23*g*, and a USE LATER button 23*h* are displayed. When the process is temporarily ended, the USE LATER button 23*h* is clicked. When the USE LATER button 23*h* is clicked, log-out of the system is performed. When the process is continuously performed, the USE IMMEDIATELY button 23*g* is clicked.

Figure 24:
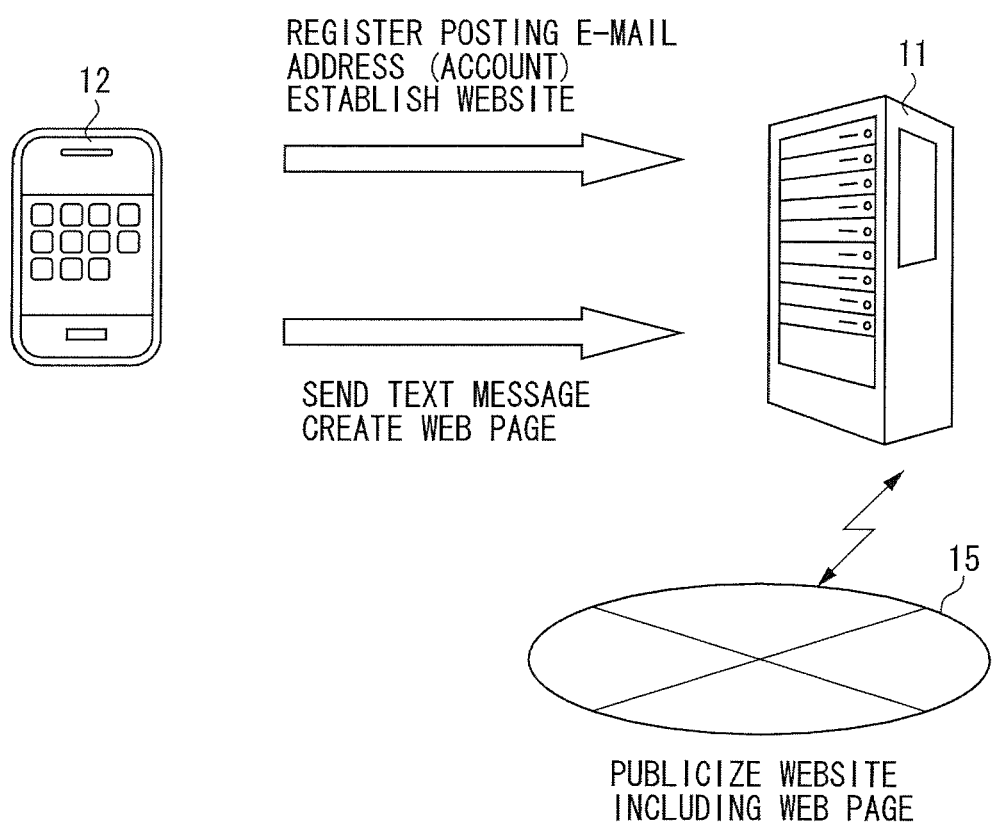
FIG. 24 is a conceptual diagram of a website establishment procedure and a web page creation procedure.
Figure 25:
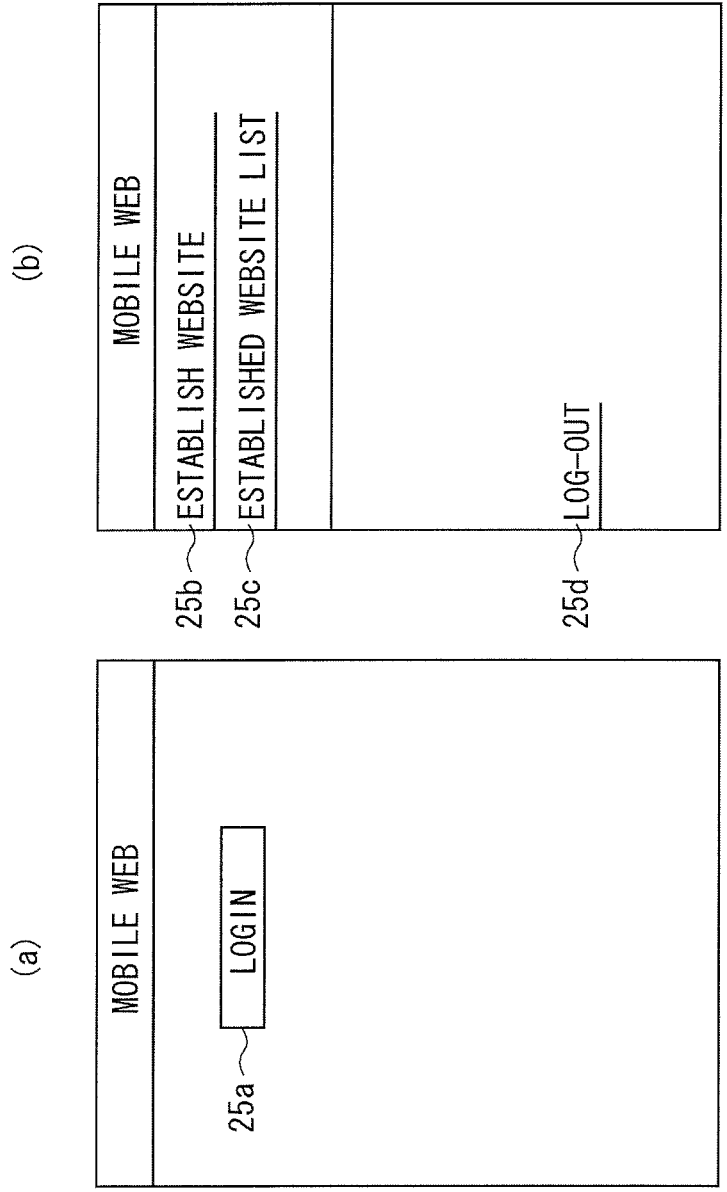
FIG. 25 is a diagram depicting an example of a mobile web screen.

FIG. 24 is a conceptual diagram of a website establishment procedure and a web page creation procedure depicted as an example, and FIG. 25 is a diagram depicting an example of a mobile web screen. FIG. 26 is a diagram depicting a website establishment screen continued from FIG. 25, and FIG. 27 is a diagram depicting the website establishment screen continued from FIG. 26. In FIGS. 25 to 27, data which is displayed in entry areas and display areas is not depicted.

When the USE IMMEDIATELY button 23*g* is clicked on the process continuation screen of FIG. 23(*b*), the second computer 11 displays a mobile web screen depicted in FIG. 25(*a*) on the display 14 of the intermediate user mobile telephone 12. Incidentally, to log in to the second computer 11 (the system) again after the USE LATER button 23*h* is clicked, after an intermediate user registration URL for logging in to the second computer is entered in the intermediate user mobile telephone 12, a login button is clicked. When the login button is clicked, the computer 11 displays the mobile web screen depicted in FIG. 25(*a*) on the display 14 of the intermediate user mobile telephone 12. On the mobile web screen of FIG. 25(*a*), a login button 25*a* is displayed.

When the login button 25*a* is clicked on the mobile web screen of FIG. 25(*a*), the second computer 11 displays a mobile web screen of FIG. 25(*b*) on the display 14 of the intermediate user mobile telephone 12. On the mobile web screen of FIG. 25(*b*), a website establishment button 25*b*, an established website list button 25*c*, and a log-out button 25*d* are displayed. When the log-out button 25*d* is clicked, log-out of the second computer 11 (the system) is performed. To establish a website, the website establishment button 25*b* is clicked on the mobile web screen of FIG. 25(*b*).

When the website establishment button 25*b* is clicked, the second computer 11 displays the website establishment screen of FIG. 26 on the display 14 of the intermediate user mobile telephone 12. On the website establishment screen of FIG. 26, a domain name entry and site establishment message, a domain name entry area 26*a*, a posting e-mail address entry area 26*b*, an identifier entry area 26*c*, a remarks entry area 26*d*, a NEXT button 26*e*, and a RETURN TO MENU button 26*f* are displayed.

After entering a registered domain name in the domain name entry area 26*a*, an arbitrary posting e-mail address in the posting e-mail address entry area 26*b*, entering an arbitrary identifier (an identification number, an identification mark, and so forth) in the identifier entry area 26*c*, and entering remarks (a shop name, the name of a shop owner, and so forth) in the remarks entry area 26*d*, the intermediate user clicks the NEXT button 26*e*. Incidentally, the intermediate user may click the NEXT button 26e with the posting e-mail address entry area 26b and the identifier entry area 26c left blank.

After the data entered in the entry areas 26a to 26d is checked on the website establishment screen of FIG. 26, when the NEXT button 26e is clicked, the second computer 11 displays a website establishment screen depicted in FIG. 27(a) on the display 14 of the intermediate user mobile telephone 12. On the website establishment screen of FIG. 27(a), a site name display area 27a in which the entered domain name is displayed, a posting e-mail address display area 27b in which the entered posting e-mail address is displayed, an identifier display area 27c in which the entered identifier is displayed, a remarks display area 27d in which the entered remarks are displayed, a site establishment message, a web establishment button 27e, and a cancel button 27f are displayed.

Incidentally, when a posting e-mail address is not entered in the posting e-mail address entry area 26b on the website establishment screen of FIG. 26, the second computer 11 generates an arbitrary posting e-mail address and uses the generated e-mail address as a posting e-mail address of the domain name. Moreover, when an identifier is not entered in the identifier entry area 26c, the computer 11 generates an arbitrary identifier and uses the generated identifier as an identifier of the domain name.

After the data displayed in the display areas 27a to 27d is checked, when web establishment is performed, the web establishment button 27e is clicked. Incidentally, when the cancel button 27f is clicked, the screen returns to the website establishment screen of FIG. 26, and data entries in the entry areas 26a to 26d are made again. When the web establishment button 27e is clicked on the website establishment screen of FIG. 27(a), the second computer 11 accesses the first computer 10 and inquires whether or not the entered domain name is registered in the first computer 10.

If the entered domain name is registered in the first computer 10, the second computer 11 stores the domain name, the posting e-mail address, the identifier, and the remarks in the hard disk and establishes a website (website establishing unit). The second computer 11 stores the domain name in the hard disk in a state in which the domain name is associated with the e-mail address and the intermediate user mobile telephone identification number of the intermediate user mobile telephone 12, and stores the posting e-mail address in the hard disk in a state in which the posting e-mail address is associated with the domain name. Furthermore, the second computer 11 stores the identifier and the remarks in the hard disk in a state in which the identifier and the remarks are associated with the posting e-mail address. Incidentally, if the entered domain name is not registered in the first computer 10, the second computer 11 displays an error message on the display 14 of the intermediate user mobile telephone 12.

After storing these data, the second computer 11 displays a website establishment screen depicted in FIG. 27(b) on the display 14 of the intermediate user mobile telephone 12. On the website establishment screen of FIG. 27(b), a site establishment completion message, a domain name display area 27g in which the domain name of the established website is displayed, a posting e-mail address display area 27h in which the posting e-mail address is displayed, and a RETURN TO MENU button 27i are displayed. When the RETURN TO MENU button 27i is clicked, the screen returns to the mobile web screen of FIG. 25(b).

Figure 28:
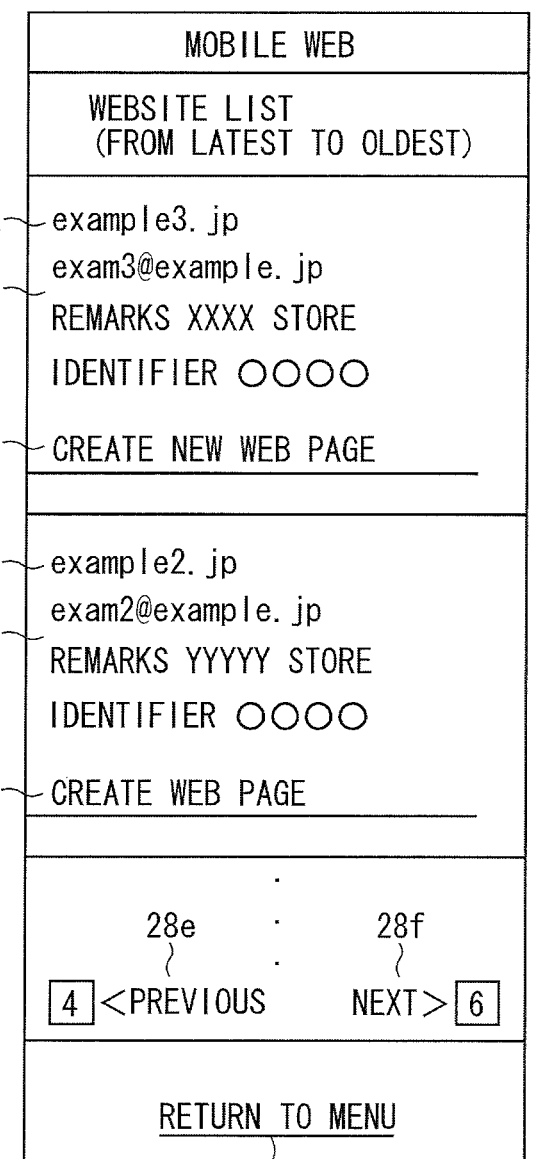
FIG. 28 is a diagram depicting an example of a website list screen.
Figure 29:
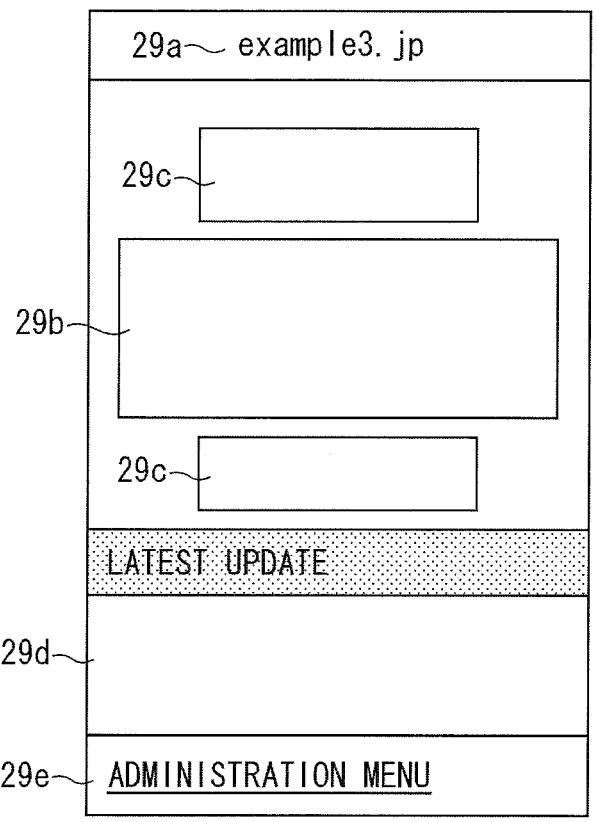
FIG. 29 is a diagram depicting an example of a website display screen.
Figure 30:
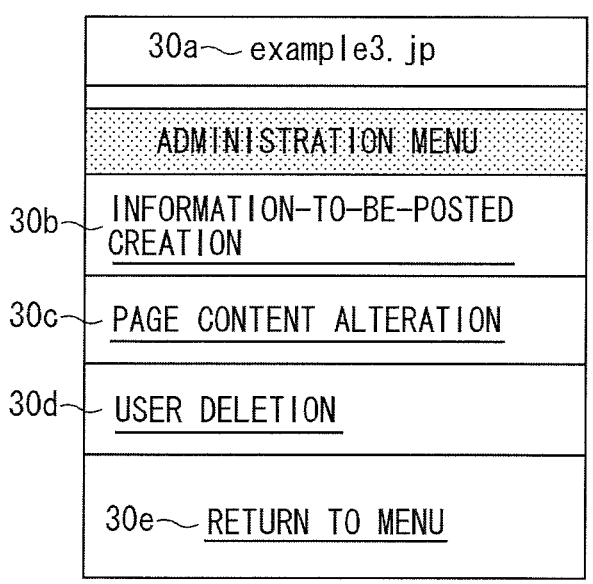
FIG. 30 is a diagram depicting an example of an administration menu screen.
Figure 31:
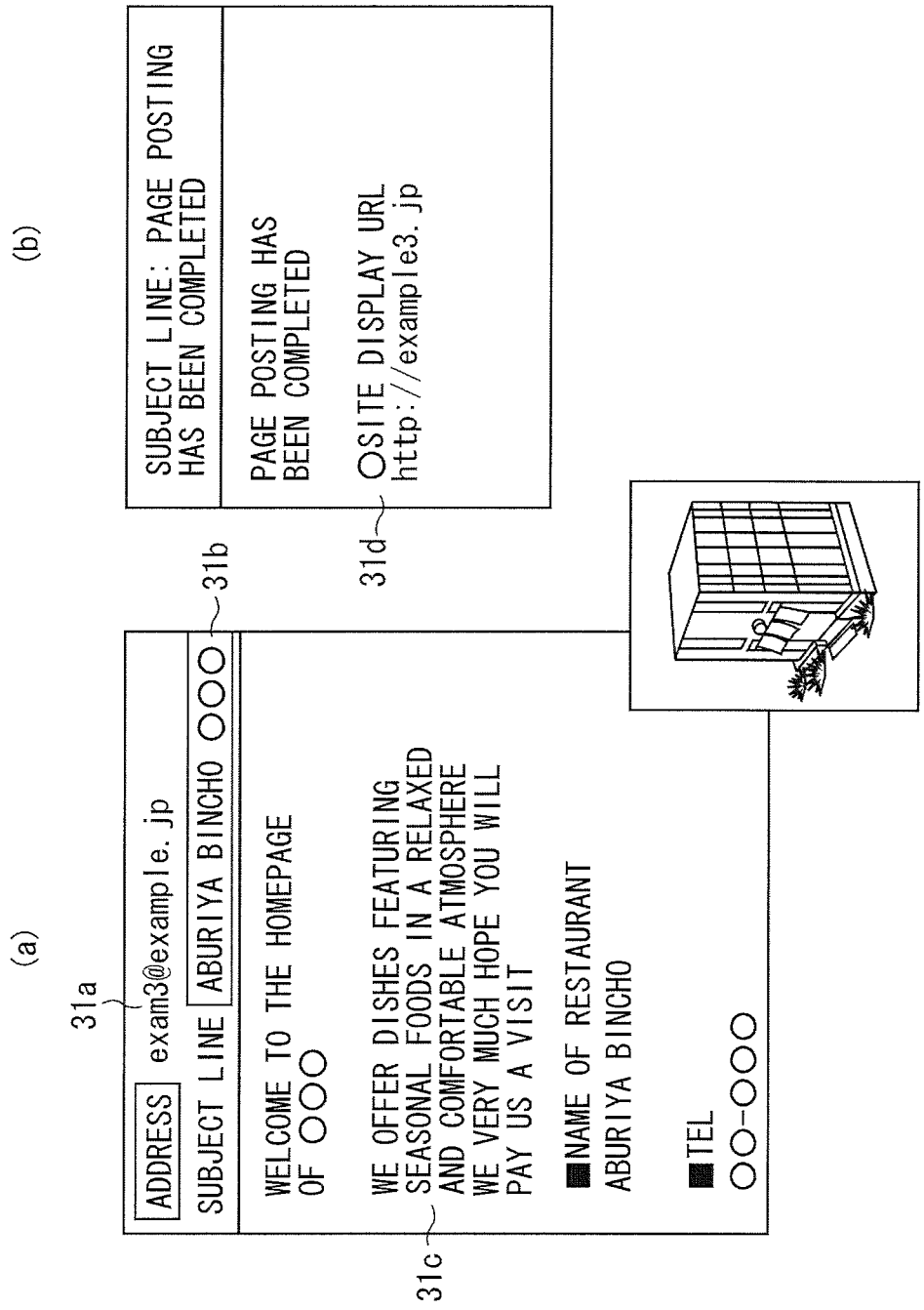
FIG. 31 is a diagram depicting an example of a web page creation screen.
Figure 32:
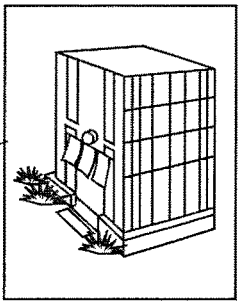
FIG. 32 is a diagram depicting an example of a completed web page screen.

FIG. 28 is a diagram depicting an example of a website list screen, and FIG. 29 is a diagram depicting an example of a website display screen. FIG. 30 is a diagram depicting an example of an administration menu screen, and FIG. 31 is a diagram depicting an example of a web page creation screen. FIG. 32 is a diagram depicting an example of a completed web page screen. In FIGS. 28 to 32, part of the data displayed in display areas is not depicted. In this website creation system, it is possible to create a web page corresponding to a website of a domain name registered by using a text message.

After the domain name entered in the website establishment procedure is entered by using the intermediate user mobile telephone 12, a login button is clicked. When the login button is clicked, the second computer 11 displays the mobile web screen of FIG. 25(a) on the display 14 of the intermediate user mobile telephone 12. On the mobile web screen of FIG. 25(a), when the login button 25a is clicked, the computer 11 displays the mobile web screen of FIG. 25(b) on the display 14 of the intermediate user mobile telephone 12. On the mobile web screen of FIG. 25(b), the established website list button 25c is clicked.

When the established website list button 25c is clicked, the second computer 11 displays a website list screen depicted in FIG. 28, the website list screen on which a list of the websites established from the past to the present is displayed, on the display 14 of the intermediate user mobile telephone 12. On the website list screen of FIG. 28, a domain name display area 28a in which the domain name is displayed, a posting e-mail address display area 28b in which the posting e-mail address is displayed, a CREATE NEW WEB PAGE button 28c or a CREATE WEB PAGE button 28d, a PREVIOUS button 28e, a NEXT button 28f, and a RETURN TO MENU button 28g are displayed. In the posting e-mail address display area 28b, in addition to the posting e-mail address, the remarks and the identifier are displayed. A website in which the CREATE NEW WEB PAGE button 28c is displayed means that a website is already established and a web page is not yet created, and a website in which the CREATE WEB PAGE button 28d is displayed means that a website is already established and a web page is already created. Incidentally, when the RETURN TO MENU button 28g is clicked, the screen returns to the mobile web screen of FIG. 25(b).

When a new web page is created, on the website list screen of FIG. 28, the CREATE NEW WEB PAGE button 28c of a particular website is clicked. When the CREATE NEW WEB PAGE button 28c is clicked, the second computer 11 displays a website display screen depicted in FIG. 29 on the display 14 of the intermediate user mobile telephone 12. On the website display screen of FIG. 29, a domain name display area 29a in which the domain name is displayed, a picture-to-be-posted display area 29b, a post display area 29c, a latest update display area 29d, and an administration menu button 29e are displayed. Incidentally, in FIG. 29, a web page is not created and the picture-to-be-posted display area 29b, the post display area 29c, and the latest update display area 29d are blank. When the administration menu button 29e is clicked on the website display screen of FIG. 29, the computer 11 displays an administration menu screen depicted in FIG. 30 on the display 14 of the intermediate user mobile telephone 12.

On the administration menu screen depicted in FIG. 30, a domain name display area 30a in which the domain name is displayed, an information-to-be-posted creation button 30b, a page content editing button 30c, and an end user deletion button 30d are displayed. When the information-to-be-posted creation button 30b is clicked on the administration menu screen of FIG. 30, a mailer is launched, and login to the mobile e-mail server of the second computer 11 is performed through use of the posting e-mail address of the website. The second computer 11 displays a web page creation screen depicted in FIG. 31(a) on the display 14 of the intermediate user mobile telephone 12. On the web page creation screen of FIG. 31(a), a posting e-mail address display area 31a, a subject line display area 31b, and a post display area 31c are displayed. The intermediate user enters a post by using the intermediate user mobile telephone 12 and, after taking a picture to be posted, sends the post and the picture to be posted to the computer 11 as a text message.

When sending of the post and the picture to be posted to the computer 11 is finished, the second computer 11 pastes the picture to be posted in the picture-to-be-posted display area 29b and pastes the post in the post display area 29c and displays the web page in the latest update display area 29d, thereby creating the web page of the website (web page first creating unit). The computer 11 stores the created web page in the hard disk in a state in which the created web page is associated with the domain name of the website. The computer 11 displays a page posting completion message screen depicted in FIG. 31(b) on the display 14 of the intermediate user mobile telephone 12.

On the page posting completion message screen of FIG. 31(b), a web page posting completion message and a website URL display area 30d are displayed. After a RETURN TO MENU button 30e is clicked on the page posting completion message screen of FIG. 31(b) to display the mobile web screen of FIG. 25(b) and the established website list button 25c on the mobile web screen of FIG. 25(b) is clicked to display the website list screen of FIG. 28 again, the CREATE WEB PAGE button 28d of the website to which the post and the picture to be posted were posted is clicked. When the CREATE WEB PAGE button 28d is clicked, the second computer 11 displays a web page screen depicted in FIG. 32 on the display 14 of the intermediate user mobile telephone 12.

On the web page screen depicted in FIG. 32, a domain name display area 32a in which the domain name is displayed, a posted picture display area 32b in which the posted picture is displayed, a post display area 32c in which the post is displayed, a latest update display area 32d in which the latest update is displayed, a NEXT button 32e, and an administration menu button 32f are displayed. The second computer 11 publicizes (outputs) the website including the created web page through the Internet 15 (refer to FIG. 24) (website first outputting unit). By accessing the website by entering the domain name of the website, any person can view the website through the Internet 15.

Since the website creation system can establish, by using the intermediate user mobile telephones 12, a plurality of websites corresponding to the domain names registered in advance and create web pages of the websites corresponding to the domain names by using the text messages sent from the intermediate user mobile telephones 12, it is possible to establish a website easily and promptly via the mobile telephone 12 of the intermediate user and create a web page of the website easily and promptly via the mobile telephone 12 of the intermediate user.

Since the website creation system creates web pages of websites for introducing a plurality of end users by using the intermediate user mobile telephones 12, it is possible to promote products and service of the plurality of end users to a wide range of people through the web pages and accelerate the use of the websites by the end users themselves. Since the websites including the web pages created by the intermediate user mobile telephones 12 are publicized (output) through the Internet 15, the website creation system can pass on information on the products and service of the plurality of end users to the entire world through the Internet 15.

Figure 33:
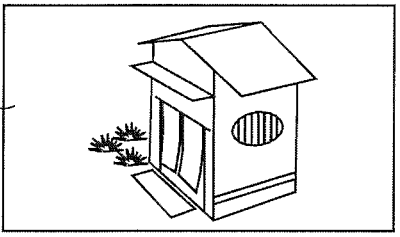
FIG. 33 is a diagram depicting an example of a page-to-be-edited selection screen.
Figure 34:
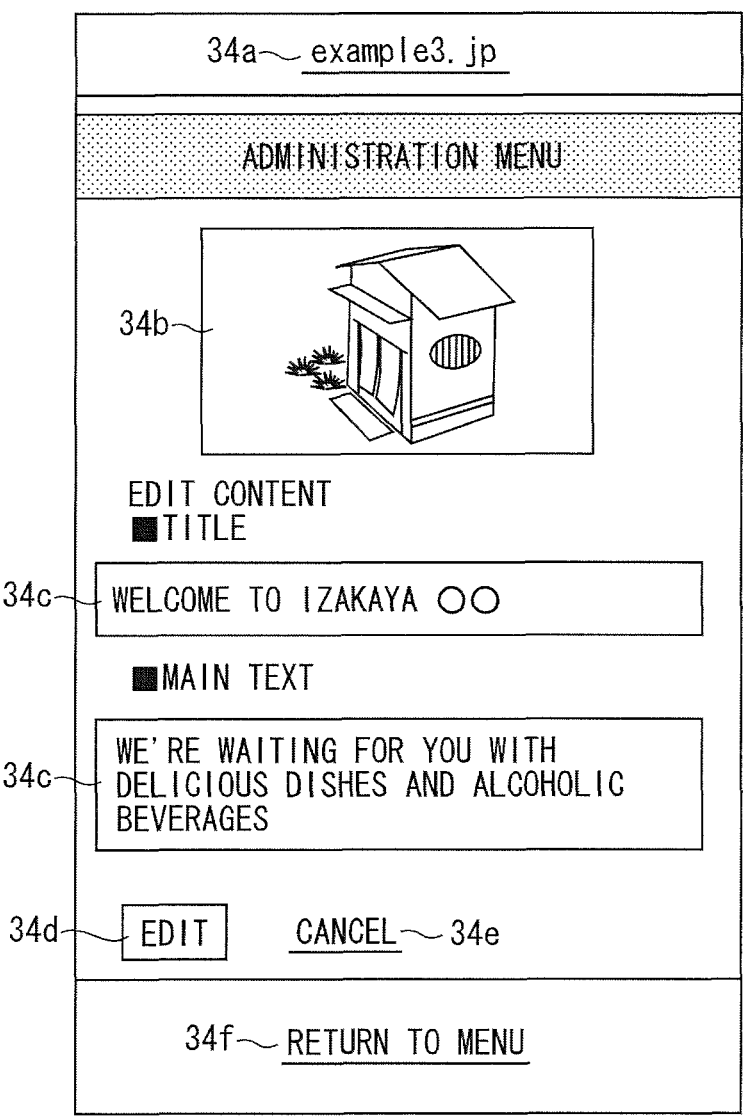
FIG. 34 is a diagram depicting an example of a web page editing screen.
Figure 35:
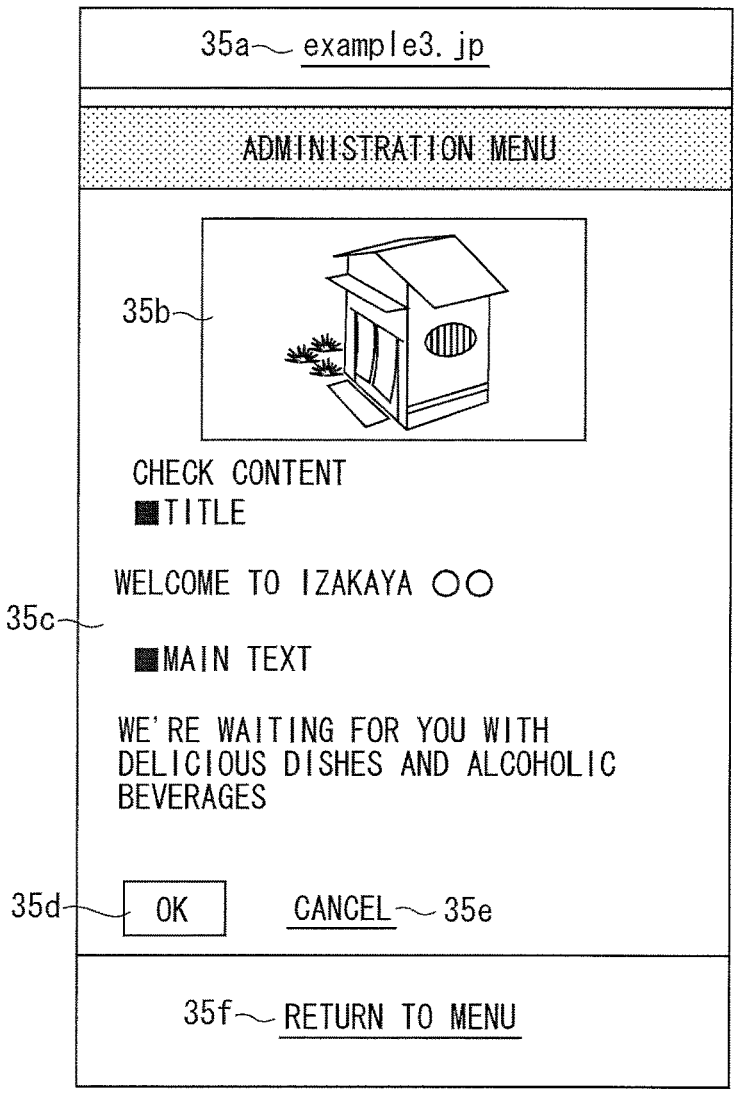
FIG. 35 is a diagram depicting an example of a page editing confirmation screen.
Figure 36:
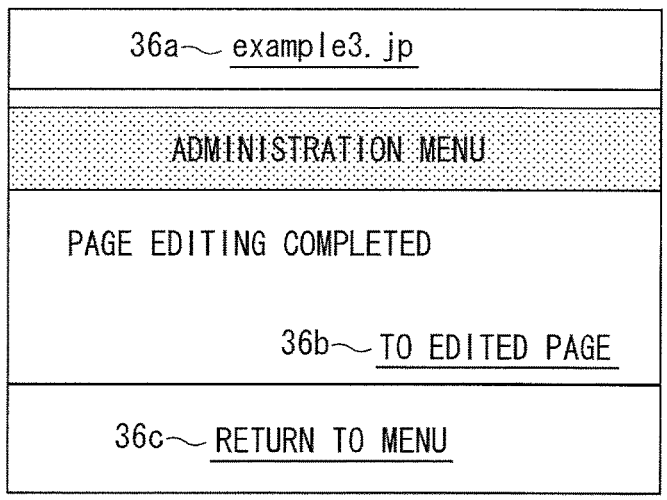
FIG. 36 is a diagram depicting an example of a page editing completion screen.

FIG. 33 is a diagram depicting an example of a page-to-be-edited selection screen, and FIG. 34 is a diagram depicting an example of a web page editing screen. FIG. 35 is a diagram depicting an example of a page editing confirmation screen, and FIG. 36 is a diagram depicting an example of a page editing completion screen. In FIGS. 33 to 36, data which is displayed in entry areas and display areas is not depicted. This website creation system can edit the created web page via the intermediate user mobile telephone 12. When the administration menu button 29e or 32f is clicked on the website display screen of FIG. 29 or the completed web page screen of FIG. 32, the second computer 11 displays the administration menu screen of FIG. 30 on the display 14 of the intermediate user mobile telephone 12. The intermediate user mobile telephone 12 is used to click a page content alteration button 30c on the administration menu screen of FIG. 30.

When the page content alternation button 30c is clicked, the second computer 11 displays a page-to-be-edited selection screen depicted in FIG. 33 on the display 14 of the intermediate user mobile telephone 12. On the page-to-be-edited selection screen depicted in FIG. 33, a domain name display area 33a in which the domain name is displayed, a page editing button 33b, a page deletion button 33c, a posted picture display area 33d in which the posted picture is displayed, a post display area 33e in which the post is displayed, a latest update display area 33f in which the latest update is displayed, a PREVIOUS button 33g, a NEXT button 33h, and a RETURN TO MENU button 33i are displayed. When the page editing button 33b is clicked on the page-to-be-edited selection screen of FIG. 33, a page editing signal is transmitted to the computer 11, and the computer 11 determines that the page is to be edited and displays a web page editing screen depicted in FIG. 34 on the display 14 of the intermediate user mobile telephone 12.

On the web page editing screen of FIG. 34, a domain name display area 34a in which the domain name is displayed, a posted picture editing area 34b in which the posted picture is displayed, a posted text editing area 34c in which the post is displayed, an editing button 34d, a cancel button 34e, and a RETURN TO MENU button 34f are displayed. When the cancel button 34e is clicked, the screen returns to the page-to-be-edited selection screen of FIG. 33. The intermediate user can change the posted picture displayed in the posted picture editing area 34b to another picture and change the posted text displayed in the posted text editing area 34c to another text by using the intermediate user mobile telephone 12. After the posted picture and the posted text are changed, the editing button 34d is clicked.

When the editing button 34d is clicked, the second computer 11 displays a page editing confirmation screen depicted in FIG. 35 on the display 14 of the intermediate user mobile telephone 12. On the page editing confirmation screen of FIG. 35, a domain name display area 35a in which the domain name is displayed, a posted picture confirmation area 35b in which the edited posted picture is displayed, a posted text confirmation area 35c in which the edited posted text is displayed, an OK button 35d, a cancel button 35e, and a RETURN TO MENU button 35f are displayed. When the cancel button 35e is clicked, the screen returns to the page-to-be-edited selection screen of FIG. 33. After the edited posted picture and posted text are checked, the OK button 35d is clicked.

When the OK button 35d is clicked, the second computer 11 pastes the edited posted picture in the posted picture display area 35b and pastes the edited post in the post display area 35c, and displays the web page in the latest update display area 33f, thereby editing the web page of the website (web page first editing unit). The computer 11 publicizes (outputs) the website including the edited web page through the Internet 15 (website first outputting unit).

After storing the edited web page in the hard disk in a state in which the edited web page is associated with the domain name of the website, the second computer 11 displays a page editing completion screen depicted in FIG. 36 on the display 14 of the intermediate user mobile telephone 12. On the page editing completion screen of FIG. 36, a domain name display area 36a in which the domain name is displayed, a page editing completion message, a TO EDITED PAGE button 36b, and a RETURN TO MENU button 36c are displayed. When the TO EDITED PAGE button 36b is clicked, the computer 11 displays the edited web page on the display 14 of the intermediate user mobile telephone 12 (quoting FIG. 33).

Since the website creation system allows the intermediate user to edit the web pages of the websites corresponding to the domain names by using the intermediate user mobile telephone 12, it is possible to make attractive web pages while editing the web pages via the intermediate user mobile telephone 12. Since the website creation system edits the web pages of the websites for introducing a plurality of end users by using the intermediate user mobile telephones 12, it is possible to promote products and service of the plurality of end users to a wide range of people through the edited web pages and accelerate the use of the websites by the end users themselves. Since the websites including the web pages edited by the intermediate user mobile telephones 12 are output through the Internet 15, the website creation system can pass on information on the products and service of the plurality of end users to the entire world through the Internet 15.

Figure 37:
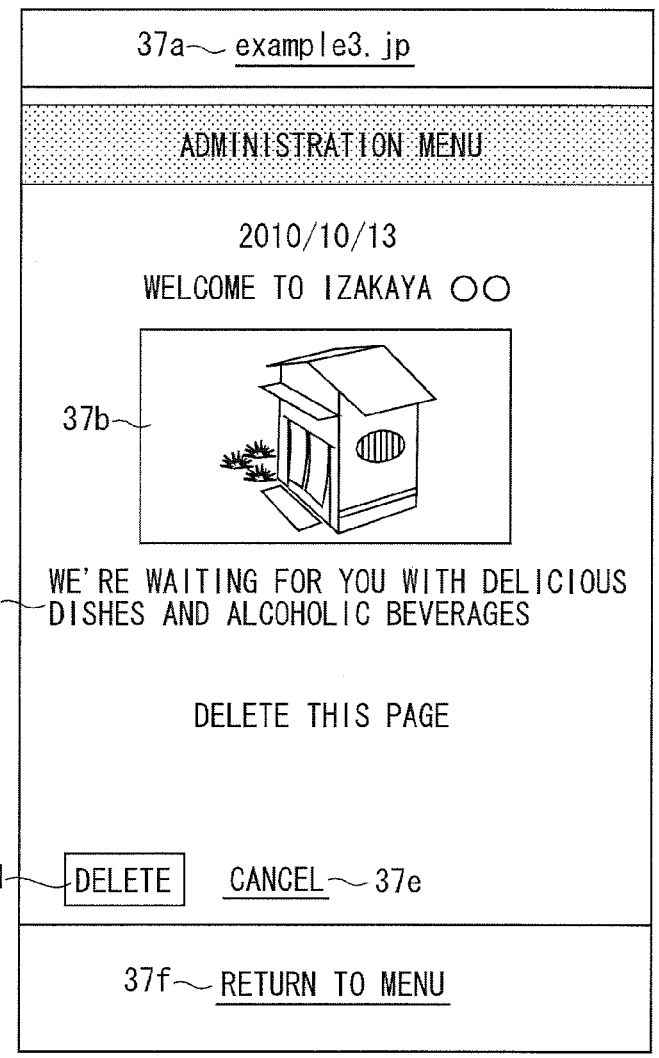
FIG. 37 is a diagram depicting an example of a web page deletion screen.
Figure 38:
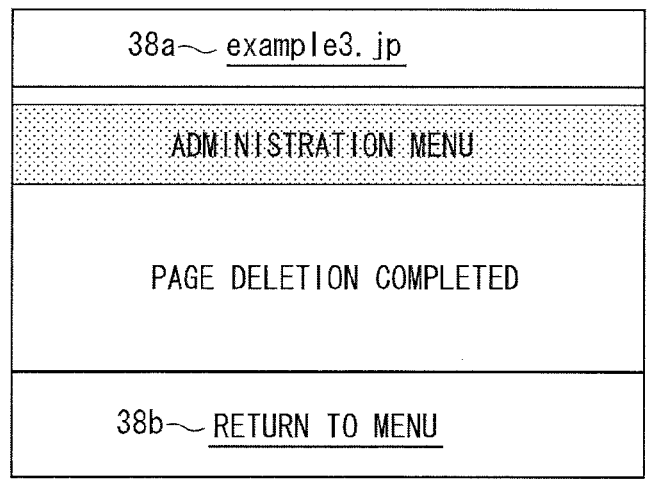
FIG. 38 is a diagram depicting an example of a page deletion confirmation screen.

FIG. 37 is a diagram depicting an example of a web page deletion screen, and FIG. 38 is a diagram depicting an example of a page deletion confirmation screen. In FIGS. 37 and 38, data which is displayed in entry areas and display areas is not depicted. This website creation system can delete a created web page via the intermediate user mobile telephone 12. When a particular web page is deleted, the page deletion button 33c is clicked on the page-to-be-edited selection screen of FIG. 33. When the page deletion button 33c is clicked, a page deletion signal is transmitted to the computer 11. When the page deletion signal is transmitted, the second computer 11 determines that the page is to be deleted and displays a web page deletion screen depicted in FIG. 37 on the display 14 of the intermediate user mobile telephone 12.

On the web page deletion screen of FIG. 37, a domain name display area 37a in which the domain name is displayed, a posted picture display area 37b in which the posted picture is displayed, a posting portion display area 37c in which the post is displayed, a deletion button 37d, a cancel button 37e, and a RETURN TO MENU button 37f are displayed. When the cancel button 37e is clicked, the screen returns to the page-to-be-edited selection screen of FIG. 33. After checking the web page to be deleted again, the intermediate user clicks the deletion button 37d when deleting the web page. When the deletion button 37d is clicked, the second computer 11 sets an ending flag (including an ending date and time) on the web page to be deleted and stores the web page in the hard disk with the ending flag (web page first deleting unit). Alternatively, the second computer 11 erases the web page from the hard disk (web page first deleting unit).

After storing the web page to be deleted in the hard disk with the ending flag or erasing, from the hard disk, the web page to be deleted, the second computer 11 displays a page deletion confirmation screen depicted in FIG. 38 on the display 14 of the intermediate user mobile telephone 12. On the page deletion confirmation screen of FIG. 38, a domain name display area 38a in which the domain name is displayed, a page deletion completion message, and a RETURN TO MENU button 38b are displayed. Since the website creation system allows the intermediate user to delete an unnecessary web page by using the intermediate user mobile telephone 12, it is possible to make attractive web pages while deleting an unnecessary web page via the intermediate user mobile telephone 12.

Figure 39:
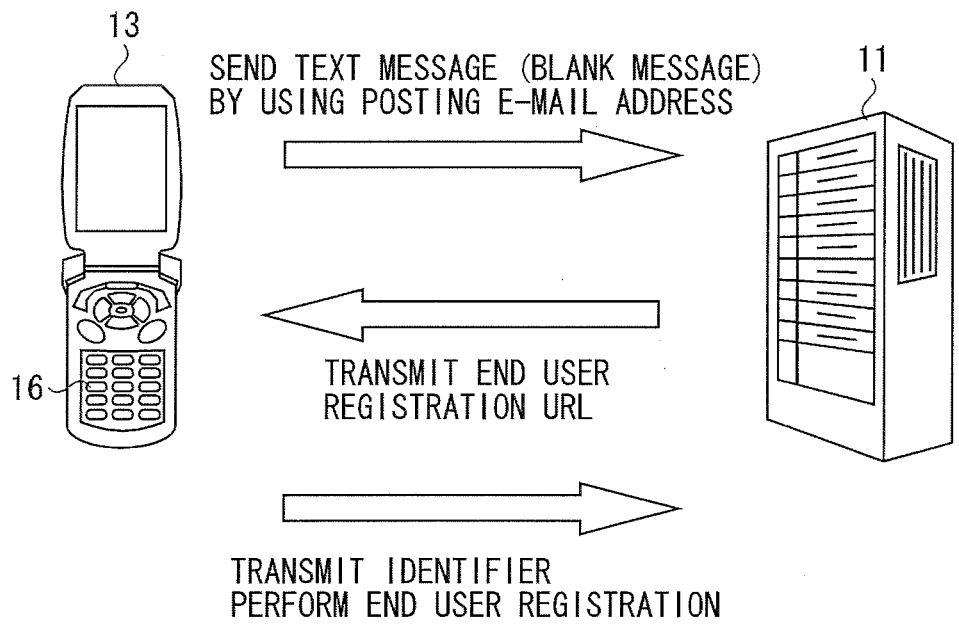
FIG. 39 is a conceptual diagram of a registration procedure of an end user mobile telephone.
Figure 40:
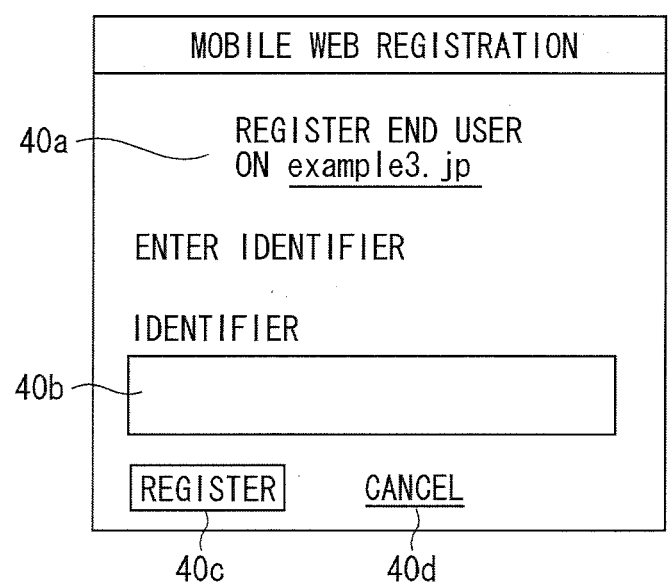
FIG. 40 is a diagram depicting an example of a registration process screen of the end user mobile telephone.
Figure 41:
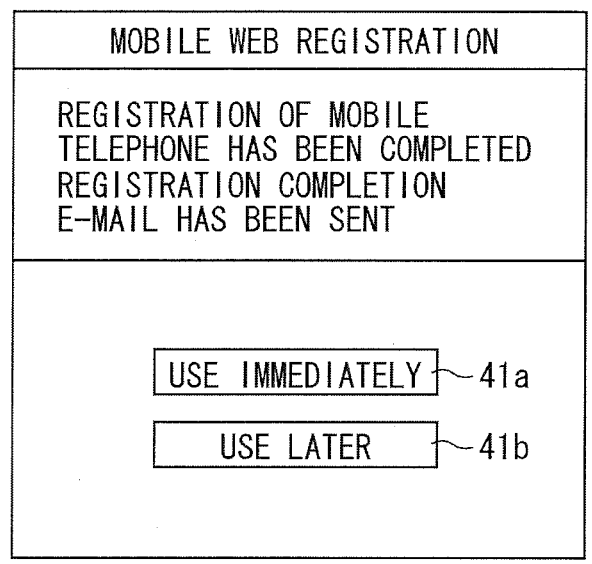
FIG. 41 is a diagram depicting an example of an end user registration completion screen.
Figure 42:
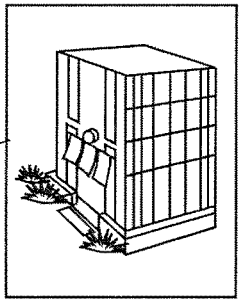
FIG. 42 is a diagram depicting an example of an end user's web page screen.

FIG. 39 is a conceptual diagram of a registration procedure of an end user mobile telephone 13 depicted as an example, and FIG. 40 is a diagram depicting an example of a registration process screen of the end user mobile telephone 13. FIG. 41 is a diagram depicting an example of an end user registration completion screen, and FIG. 42 is a diagram depicting an example of an end user's web page screen. In FIGS. 39 to 41, a registration procedure of the end user mobile telephone 13 in the second computer 11 is depicted. In FIG. 39, only one mobile telephone 13 is depicted, but a plurality of mobile telephones 13 are present in an actual system, and text messages are sent and received between the mobile telephones 13 and the second computer 11. In FIGS. 40 to 42, data which is displayed in entry areas and display areas is not depicted.

The intermediate user visits an end user's shop, for example, shows a website including a web page of the end user, the web page created via the intermediate user mobile telephone 12, to the end user, and promotes the attractiveness of the system that can use the web page as a web page of the end user as it is by using the end user mobile telephone 12 and can edit and update the web page easily via the end user mobile telephone 13. If the end user likes the system and decides to introduce it, a procedure of registration of the end user to the second computer 11 (the system) is performed.

Based on FIGS. 39 to 41, a procedure of registration of the end user mobile telephone 13 in the second computer 11 will be described as follows. Incidentally, it is only necessary to register the end user mobile telephone 13 in the second computer 11 (the system) just one time if the end user mobile telephone 13 is one and the same mobile telephone 13, and there is no need to perform a registration process more than once. The computer 11 makes the end user mobile telephone 13 send a text message (a blank message) to a posting e-mail address (a posting e-mail address of the mobile e-mail server of the second computer 11) of the website of the end user (e-mail sending second requesting unit). The end user sends a text message (a blank message) to a designated posting e-mail address from the end user mobile telephone 13. To the computer 11, an e-mail address of the end user mobile telephone 13 and an end user mobile telephone identification number that identifies the end user mobile telephone 13 are transmitted.

When the text message is sent from the end user mobile telephone 13 to the computer 11, the second computer 11 registers (stores) the e-mail address of the end user mobile telephone 13 in the hard disk and registers (stores) the end user mobile telephone identification number of the end user mobile telephone 13 in the hard disk (e-mail address second registering unit). The computer 11 stores the e-mail address of the end user mobile telephone 13 in the hard disk in a state in which the e-mail address of the end user mobile telephone 13 is associated with the end user mobile telephone identification number.

After storing the e-mail address and the end user mobile telephone identification number of the end user mobile telephone 13 in the hard disk, the second computer 11 generates an end user registration URL (a URL for logging in to the second computer) corresponding to the e-mail address of the end user mobile telephone 13 and stores the generated end user registration URL in the hard disk in a state in which the generated end user registration URL is associated with the e-mail address and the end user mobile telephone identification number of the end user mobile telephone 13. After storing the end user registration URL in the hard disk, the computer 11 transmits the generated end user registration URL to the end user mobile telephone 13 by using the e-mail address of the end user mobile telephone 13 (URL second transmitting unit).

To the end user mobile telephone 13 of the end user who sent the text message, a text message displaying the end user registration URL is sent from the second computer 11. The end user who received the end user registration URL can log in to the computer 11 (the system) by clicking the end user registration URL displayed on a display 16. When the URL displayed on the display 16 of the end user mobile telephone 13 is clicked, the end user mobile telephone 13 logs in to the computer 11 (the system), and a registration process screen of the mobile telephone 13, the registration process screen depicted in FIG. 40, is displayed on the display 16 of the mobile telephone 13.

On the registration process screen of FIG. 40, a domain name display area 40a, an identifier entry area 40b, a registration button 40c, and a cancel button 40d are displayed. When the cancel button 40d is clicked, log-out of the computer 11 (the system) is performed. After entering the identifier in the identifier entry area 40b, the end user clicks the registration button 40c. Incidentally, as the identifier, the identifier registered from the intermediate user mobile telephone 12 in the computer 11 when the website was established by the intermediate user mobile telephone 12 is used. The end user gets the identifier from the intermediate user at the time of registration of the end user mobile telephone 13.

When the identifier is entered in the identifier entry area 40b and the registration button 40c is clicked, the identifier entered in the identifier entry area 40b is transmitted to the second computer 11. The computer 11 applies the transmitted identifier to the identifier stored in the hard disk, and, if an identifier identical to the transmitted identifier is stored in the hard disk and end user registration is not performed in the website corresponding to the identifier, the computer 11 approves the user registration of the end user. If an identifier identical to the transmitted identifier is not stored in the hard disk or end user registration is already performed in the website corresponding to the identifier, the computer 11 displays a user registration not-approved message on the display 16 of the end user mobile telephone 13.

After approving end user registration, the second computer 11 sets a registration flag on the e-mail address and the end user mobile telephone identification number of the end user mobile telephone 13 (end user registering unit). After setting the registration flag, the computer 11 displays an end user registration completion screen depicted in FIG. 41 on the display 16 of the end user mobile telephone 13. On the registration completion screen of FIG. 41, a mobile telephone registration completion message, a registration completion e-mail sending message, a USE IMMEDIATELY button 41a, and a USE LATER button 41b are displayed. When the process by the end user mobile telephone 13 is temporarily ended, the USE LATER button 41b is clicked. When the USE LATER button 41b is clicked, log-out of the system is performed. When the process is continuously performed, the USE IMMEDIATELY button 41a is clicked.

In this website creation system, the registered end user can create a new web page of his/her website, edit the web page, and delete the web page. A web page creation procedure by the end user will be described as follows. By using the end user mobile telephone 13, the end user clicks the end user registration URL displayed on the end user mobile telephone 13 or enters the end user registration URL and clicks the login button.

When the end user mobile telephone 13 logs in to the computer 11 (the system), an end user's web page screen depicted in FIG. 42 is displayed on the display 16 of the end user mobile telephone 13. On the end user's web page screen of FIG. 42, a domain name display area 42a in which the domain name is displayed, a posted picture display area 42b in which the posted picture is displayed, a post display area 42c in which the post is displayed, a latest update display area 42d in which the latest update is displayed, a NEXT button 42e, and an administration menu button 42f are displayed. The second computer 11 publicizes (outputs) the website including the web page displayed on the display 16 of the end user mobile telephone 13 through the Internet 15 (website second outputting unit). By accessing the website by entering the domain name of the website, any person can view the website through the Internet 15.

When the administration menu button 42f is clicked on the web page screen displayed on the display 16 of the end user mobile telephone 13, the second computer 11 displays the administration menu screen on the display 16 of the end user mobile telephone 13 (quoting FIG. 30). The end user mobile telephone 13 is used to click the information-to-be-posted creation button on the administration menu screen. When the information-to-be-posted creation button is clicked, a mailer is launched, and login to the mobile e-mail server of the second computer 11 is performed through use of the posting e-mail address of the website. The second computer 11 displays the web page creation screen on the display 16 of the end user mobile telephone 13 (quoting FIG. 31(a)). The end user enters a post by using the end user mobile telephone 13 and, after taking a picture to be posted, sends the post and the picture to be posted to the computer 11 as a text message.

When sending of the post and the picture to be posted to the computer 11 is finished, the second computer 11 pastes the picture to be posted on the posted picture display area and pastes the post in the post display area and displays the web page in the latest update display area, thereby creating the web page of the website (web page second creating unit). The computer 11 stores the created web page in the hard disk in a state in which the created web page is associated with the domain name of the website. The computer 11 displays the page posting completion message screen on the display 16 of the end user mobile telephone 13 (quoting FIG. 31(b)).

When the end user mobile telephone 13 logs in to the computer 11 (the system), the web page screen created by the end user is displayed on the display 16 of the end user mobile telephone 13. The second computer 11 publicizes (outputs) the website including the web page displayed on the display 16 of the end user mobile telephone 13 through the Internet 15 (website second outputting unit).

The website creation system can create a web page of a website corresponding to a particular domain name by using a text message sent from the end user mobile telephone 13 and can create a web page of a website easily and promptly via the mobile telephone 13 of the end user. Since the website creation system creates a web page of each website for introducing a particular end user by using the end user mobile telephone 13, it is possible to promote a product and service of the particular end user to a wide range of people through the created web page, and, since the website including the created web page is publicized through the Internet 15, it is possible to pass on information on the product and service of the end user to the entire world through the Internet 15.

This website creation system can edit the created web page via the end user mobile telephone 13. A procedure by which the end user edits the web page will be described as follows. The end user mobile telephone 13 is used to click the page content alteration button on the administration menu screen (quoting FIG. 30). When the page content alteration button is clicked, the second computer 11 displays the page-to-be-edited selection screen on the display 16 of the end user mobile telephone 13 (quoting FIG. 33). When the page editing button is clicked on the page-to-be-edited selection screen, a page editing signal is transmitted to the computer 11, and the computer 11 determines that the page is to be edited and displays the web page editing screen on the display 16 of the end user mobile telephone 13 (quoting FIG. 34).

The end user can change the posted picture displayed in the posted picture editing area to another picture and change the posted text displayed in the posted text editing area to another text by using the end user mobile telephone 13. After the posted picture and the posted text are changed, the editing button is clicked. When the editing button is clicked, the second computer 11 displays the page editing confirmation screen on the display 16 of the end user mobile telephone 13 (quoting FIG. 35).

After the edited posted picture and the edited posted text are checked, the OK button is clicked on the page editing confirmation screen. When the OK button is clicked, the second computer 11 pastes the edited posted picture in the posted picture display area and pastes the edited post in the post display area and displays the web page in the latest update display area, thereby editing the web page of the website (web page second editing unit). The computer 11 publicizes the website including the edited web page through the Internet 15 (website second outputting unit).

The second computer 11 stores the edited web page in the hard disk in a state in which the edited web page is associated with the domain name of the website. The computer 11 displays the page editing completion screen on the display 16 of the end user mobile telephone 13 (quoting FIG. 36). When the TO EDITED PAGE button is clicked on the page editing completion screen, the computer 11 displays the edited web page on the display 16 of the end user mobile telephone 13.

Since the website creation system allows the end user to edit the web page of the website corresponding to the domain name by using the end user mobile telephone 13, it is possible to make attractive web pages while editing the web page via the end user mobile telephone 13. Since the website creation system edits the web page of the website for introducing itself by using the end user mobile telephone 13, it is possible to promote a product and service of the end user to a wide range of people through the edited web page. Since the website including the web page edited by the end user mobile telephone 13 is output through the Internet 15, the website creation system can pass on information on the product and service of the end user to the entire world through the Internet 15.

This website creation system can delete the created web page via the end user mobile telephone 13. A procedure by which the end user deletes the web page will be described as follows. When a particular web page is deleted, the page deletion button is clicked on the page-to-be-edited selection screen (quoting FIG. 33). When the page deletion button is clicked, a page deletion signal is transmitted to the computer 11, and the second computer 11 determines that the page is to be deleted and displays the web page deletion screen on the display 16 of the end user mobile telephone 13 (quoting FIG. 37).

After checking the web page to be deleted again, the end user clicks the deletion button when deleting the web page. When the deletion button is clicked, the second computer 11 sets an ending flag (including an ending date and time) on the web page to be deleted and stores the web page in the hard disk with the ending flag (web page second deleting unit). Alternatively, the second computer 11 erases the web page from the hard disk (web page second deleting unit).

After storing the web page to be deleted in the hard disk with the ending flag or erasing, from the hard disk, the web page to be deleted, the second computer 11 displays the page deletion confirmation screen on the display 16 of the end user mobile telephone 13 (quoting FIG. 38). Since the website creation system allows the end user to delete an unnecessary web page by using the end user mobile telephone 13, it is possible to make attractive web pages while deleting an unnecessary web page via the end user mobile telephone 13.

Figure 43:
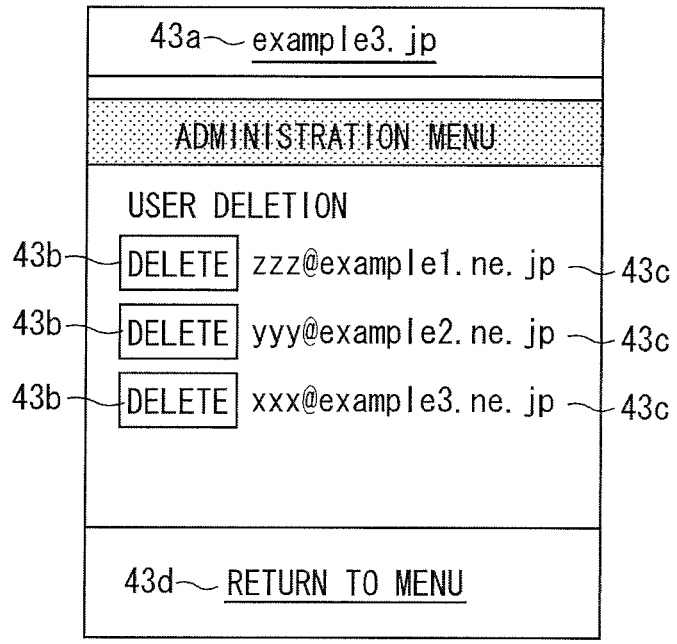
FIG. 43 is a diagram depicting an example of an end user registration deletion screen.
Figure 44:
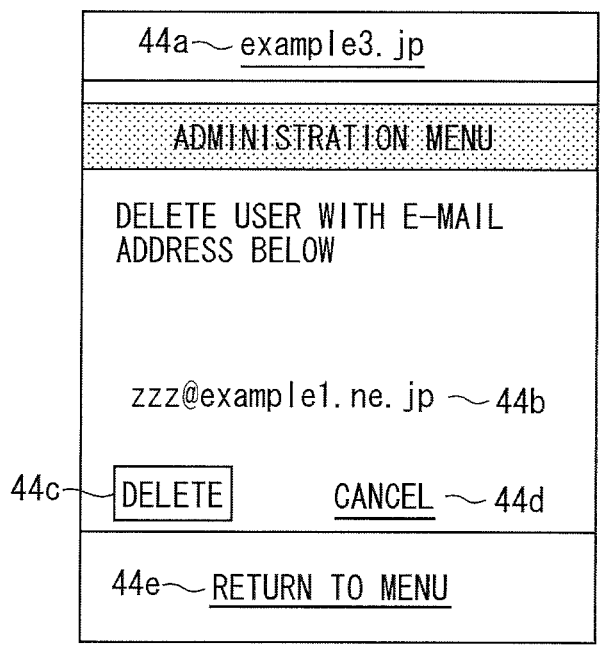
FIG. 44 is a diagram depicting an example of an end user registration deletion confirmation screen.
Figure 45:
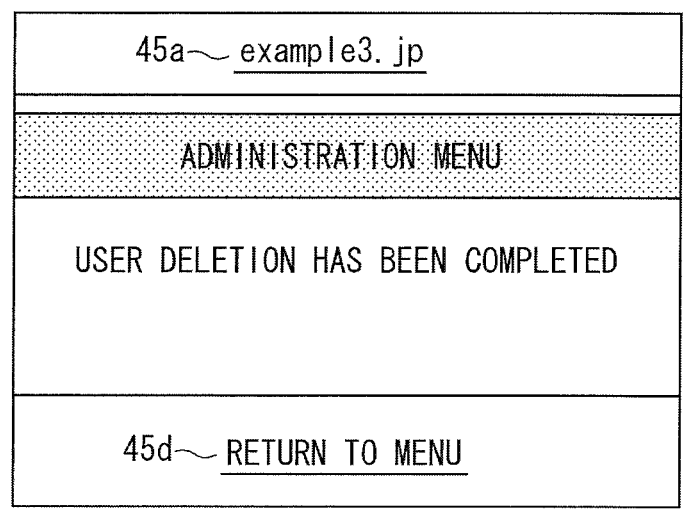
FIG. 45 is a diagram depicting an example of an end user registration deletion completion screen.

FIG. 43 is a diagram depicting an example of an end user registration deletion screen, and FIG. 44 is a diagram depicting an example of an end user registration deletion confirmation screen. FIG. 45 is a diagram depicting an example of an end user registration deletion completion screen. By deleting the registration of the end user who is already registered, this website creation system can cancel the end user registration of the user. Incidentally, deletion of the end user registration can be performed only by the intermediate user mobile telephone 12. Based on FIGS. 43 to 45, an end user registration deletion procedure will be described as follows.

The intermediate user clicks the user deletion button 30*d* on the administration menu screen (quoting FIG. 30) by using the intermediate user mobile telephone 12. When the user deletion button 30*d* is clicked, the second computer 11 displays a user deletion screen depicted in FIG. 43 on the display 14 of the intermediate user mobile telephone 12. On the user deletion screen of FIG. 43, a domain name display area 43*a* in which the domain name is displayed, a deletion button 43*b*, a posting e-mail address-to-be-deleted display area 43*c* in which a posting e-mail address is displayed, and a RETURN TO MENU button 43*d* are displayed. If there is a posting e-mail address to be deleted on the user deletion screen of FIG. 43, the deletion button 43*b* corresponding to the posting e-mail address is clicked.

When the deletion button 43*b* is clicked, a deletion signal of the posting e-mail address is transmitted from the intermediate user mobile telephone 12 to the computer 11. The second computer 11 displays a user deletion confirmation screen depicted in FIG. 44 on the display 14 of the intermediate user mobile telephone 12. On the user deletion confirmation screen of FIG. 44, a domain name display area 44*a* in which the domain name is displayed, a posting e-mail address-to-be-deleted display area 44*b* in which a posting e-mail address to be deleted is displayed, a deletion button 44*c*, a cancel button 44*d*, and a RETURN TO MENU button 44*e* are displayed. After checking the posting e-mail address to be deleted, the intermediate user clicks the deletion button 44*c*.

When the deletion button 44*c* is clicked, the second computer 11 sets an ending flag (including an ending date and time) on the posting e-mail address to be deleted and stores the posting e-mail address in the hard disk with the ending flag (end user deleting unit). Alternatively, the second computer 11 erases the posting e-mail address from the hard disk (end user deleting unit).

After storing the posting e-mail address to be deleted in the hard disk with the ending flag or erasing, from the hard disk, the posting e-mail address to be deleted, the second computer 11 displays a user deletion completion screen depicted in FIG. 45 on the display 14 of the intermediate user mobile telephone 12. On the user deletion completion screen depicted in FIG. 45, a domain name display area 45*a* in which the domain name is displayed, a user deletion completion message, and a RETURN TO MENU button 45*b* are displayed. By deleting the end user registration of an end user who does not desire to use the system and an end user who desires to terminate the use of the system, the website creation system can prevent the establishment of a website which is not necessary for the end user and the creation of an unnecessary web page.

In the above-described embodiment, a case in which the intermediate user registration and the end user registration are performed and the establishment of a website and the creation of a web page are performed in the second computer 11 in addition to the first computer 10 has been described, but it is possible to make up the system by using only the first computer 10 without the second computer 11 and omit the second computer 11. A case in which the units of the system are carried out through use of only the first computer 10 will be described as follows. When only the first computer 10 is used, some examples of the intermediate user include an administrator and a sales representative of the system operator. Incidentally, since the registration procedure of the intermediate user mobile telephone 12 in the first computer 10 is the same as that of the above-described embodiment, the explanation thereof is omitted.

After the USE IMMEDIATELY button 3*g* is clicked on the process continuation screen of FIG. 3(*b*) or the intermediate user registration URL for logging in to the first computer is entered in the intermediate user mobile telephone 12, the login button is clicked. When the login button is clicked, the first computer 10 displays the mobile web screen on the display 14 of the intermediate user mobile telephone 12 (quoting FIG. 25(*a*)). When the login button 25*a* is clicked on the mobile web screen, the first computer 10 displays the next mobile web screen on the display 14 of the intermediate user mobile telephone 12 (quoting FIG. 25(*b*)). To establish a website, the website establishment button 25*b* is clicked on the mobile web screen.

When the website establishment button 25*b* is clicked, the first computer 10 displays the website establishment screen on the display 14 of the intermediate user mobile telephone 12 (quoting FIG. 26). After entering the registered domain name in the domain name entry area 26*a*, an arbitrary posting e-mail address in the posting e-mail address entry area 26*b*, an arbitrary identifier (an identification number, an identification mark, and so forth) in the identifier entry area 26*c*, and entering remarks (a shop name, the name of a shop owner, and so forth) in the remarks entry area 26*d*, the intermediate user clicks the NEXT button 26*e*.

When the NEXT button 26*e* is clicked on the website establishment screen, the first computer 10 displays the website establishment screen on the display 14 of the intermediate user mobile telephone 12 (quoting FIG. 27(*a*)). Incidentally, when a posting e-mail address is not entered in the posting e-mail address entry area 26*b* on the website establishment screen, the computer 10 generates an arbitrary posting e-mail address and uses the generated e-mail address as a posting e-mail address of the domain name. Moreover, when an identifier is not entered in the identifier entry area 26*c*, the computer 10 generates an arbitrary identifier and uses the generated identifier as an identifier of the domain name.

When the website establishment button 27*e* is clicked on the website establishment screen, the first computer 10 determines whether or not the entered domain name is registered in the computer 10. If the entered domain name is registered in the computer 10, the computer 10 stores the domain name, the posting e-mail address, the identifier, and the remarks in the hard disk and establishes a website (website establishing unit).

The first computer 10 stores the domain name in the hard disk in a state in which the domain name is associated with the e-mail address and the intermediate user mobile telephone identification number of the intermediate user mobile telephone 12 and stores the posting e-mail address in the hard disk in a state in which the posting e-mail address is associated with the domain name. Furthermore, the first computer 10 stores the identifier and the remarks in the hard disk in a state in which the identifier and the remarks are associated with the posting e-mail address. Incidentally, if the entered domain name is not registered in the computer 10, the computer 10 displays an error message on the display 14 of the intermediate user mobile telephone 12. After storing these data, the computer 10 displays the website establishment screen on the display 14 of the intermediate user mobile telephone 12 (quoting FIG. 27(*b*)). When the RETURN TO MENU button 27*j* is clicked, the screen returns to the mobile web screen (quoting FIG. 25(*b*)).

After the intermediate user mobile telephone 12 is used to enter the domain name entered in the website establishment procedure, the login button is clicked. When the login button is clicked, the first computer 10 displays the mobile web screen of FIG. 25(*a*) on the display 14 of the intermediate user mobile telephone 12. On the mobile web screen of FIG. 25(*a*), when the login button 25*a* is clicked, the computer 10 displays the mobile web screen of FIG. 25(*b*) on the display 14 of the intermediate user mobile telephone 12. The established website list button 25*c* is clicked on the mobile web screen of FIG. 25(*b*). When the established website list button 25*c* is clicked, the computer 10 displays, on the display 14 of the intermediate user mobile telephone 12, the website list screen in which a list of the websites established from the past to the present is displayed (quoting FIG. 28).

When a new web page is created, on the website list screen of FIG. 28, the CREATE NEW WEB PAGE button 28*c* of a particular website is clicked. When the CREATE NEW WEB PAGE button 28*c* is clicked, the first computer 10 displays the website display screen depicted in FIG. 29 on the display 14 of the intermediate user mobile telephone 12 (quoting FIG. 29). When the administration menu button 29*e* is clicked on the website display screen of FIG. 29, the computer 10 displays the administration menu screen depicted in FIG. 30 on the display 14 of the intermediate user mobile telephone 12 (quoting FIG. 30).

When the information-to-be-posted creation button 30b is clicked on the administration menu screen of FIG. 30, a mailer is launched, and login to the mobile e-mail server of the first computer 10 is performed through use of the posting e-mail address of the website. The first computer 10 displays the web page creation screen on the display 14 of the intermediate user mobile telephone 12 (quoting FIG. 31(a)). The intermediate user uses the intermediate user mobile telephone 12 to enter a post and, after taking a picture to be posted, sends the post and the picture to be posted to the computer 10 as a text message.

When sending of the post and the picture to be posted to the computer 10 is finished, the first computer 10 pastes the picture to be posted in the posted picture display area 29b and pastes the post in the post display area 29c and displays the web page in the latest update display area 29d, thereby creating the web page of the website (web page first creating unit). The computer 10 stores the created web page in the hard disk in a state in which the created web page is associated with the domain name of the website. The computer 10 displays the page posting completion message screen on the display 14 of the intermediate user mobile telephone 12 (quoting FIG. 31(b)).

After the RETURN TO MENU button 30e is clicked on the page posting completion screen of FIG. 31(b) to display the mobile web screen of FIG. 25(b) and the establishment website list button 25c on the mobile web screen of FIG. 25(b) is clicked to display the website list screen of FIG. 28 again, the CREATE WEB PAGE button 28d of the website to which the post and the posted picture have been posted is clicked. When the CREATE WEB PAGE button 28d is clicked, the first computer 10 displays the web page screen on the display 14 of the intermediate user mobile telephone 12 (quoting FIG. 32). The first computer 10 publicizes (outputs) the website including the created web page through the Internet 15 (website first outputting unit).

Since the website creation system can establish, by using the intermediate user mobile telephones 12, a plurality of websites corresponding to the domain names registered in advance and create web pages of the websites corresponding to the domain names by using the text messages sent from the intermediate user mobile telephones 12, it is possible to establish a website easily and promptly via the mobile telephone 12 of the intermediate user and create a web page of the website easily and promptly via the mobile telephone 12 of the intermediate user.

Since the website creation system creates web pages of websites for introducing a plurality of end users by using the intermediate user mobile telephones 12, it is possible to promote products and service of the plurality of end users to a wide range of people through the web pages and accelerate the use of the websites by the end users themselves. Since the websites including the web pages created by the intermediate user mobile telephones 12 are publicized (output) through the Internet 15, the website creation system can pass on information on the products and service of the plurality of end users to the entire world through the Internet 15.

When the created web page is edited via the intermediate user mobile telephone 12, the administration menu button 29e or 32f is clicked on the website display screen of FIG. 29 or the completed web page screen of FIG. 32. When the administration menu button 29e or 32f is clicked, the first computer 10 displays the administration menu screen of FIG. 30 on the display 14 of the intermediate user mobile telephone 12. The intermediate user mobile telephone 12 is used to click the page content alteration button 30c on the administration menu screen of FIG. 30.

When the page content alteration button 30c is clicked, the first computer 10 displays the page-to-be-edited selection screen depicted in FIG. 33 on the display 14 of the intermediate user mobile telephone 12 (quoting FIG. 33). When the page editing button 33b is clicked on the page-to-be-edited selection screen of FIG. 33, a page editing signal is transmitted to the computer 10, and the computer 10 determines that the page is to be edited and displays the web page editing screen on the display 14 of the intermediate user mobile telephone 12 (quoting FIG. 34). The intermediate user can change the posted picture displayed in the posted picture editing area 34b to another picture and change the posted text displayed in the post editing area 34c to another text by using the intermediate user mobile telephone 12. After the posted picture and the posted text are changed, the editing button 34d is clicked.

When the editing button 34d is clicked, the first computer 10 displays the page editing confirmation screen on the display 14 of the intermediate user mobile telephone (quoting FIG. 35). After the edited posted picture and the edited posted text are checked, the OK button 35d is clicked. When the OK button 35d is clicked, the computer 10 pastes the edited posted picture in the posted picture display area 33d and pastes the edited post in the post display area 33e and displays the web page in the latest update display area 33f, thereby editing the web page of the website (web page first editing unit). The computer 10 publicizes (outputs) the website including the edited web page through the Internet 15 (website first outputting unit).

The first computer 10 stores the edited web page in the hard disk in a state in which the edited web page is associated with the domain name of the website. The computer 10 displays the page editing completion screen on the display 14 of the intermediate user mobile telephone 12 (quoting FIG. 36). When the TO EDITED PAGE button 36b is clicked on the page editing completion screen of FIG. 36, the computer 10 displays the edited web page on the display 14 of the intermediate user mobile telephone 12.

Since the website creation system allows the intermediate user to edit the web pages of the websites corresponding to the domain names by using the intermediate user mobile telephone 12, it is possible to make attractive web pages while editing the web page via the intermediate user mobile telephone 12. Since the website creation system edits the web pages of the websites for introducing a plurality of end users by using the intermediate user mobile telephones 12, it is possible to promote products and service of the plurality of end users to a wide range of people through the edited web pages and accelerate the use of the websites by the end users themselves. Since the websites including the web pages edited by the intermediate user mobile telephones 12 are output through the Internet 15, the website creation system can pass on information on the products and service of the plurality of end users to the entire world through the Internet 15.

When a particular web page is deleted, the page deletion button 33c is clicked on the page-to-be-edited selection screen of FIG. 33. When the page deletion button 33c is clicked, a page deletion signal is transmitted to the computer 10, and the first computer 10 determines that the page is to be deleted and displays a web page deletion screen depicted in FIG. 37 on the display 14 of the intermediate user mobile telephone 12 (quoting FIG. 37). After checking the web page to be deleted again on the web page deletion screen of FIG. 37, the intermediate user clicks the deletion button 37d when deleting the web page. When the deletion button 37d is clicked, the computer 10 sets an ending flag (including an ending date and time) on the web page to be deleted and stores the web page in the hard disk with the ending flag (web page first deleting unit). Alternatively, the computer 10 erases the web page from the hard disk (web page first deleting unit).

After storing the web page to be deleted in the hard disk with the ending flag or erasing, from the hard disk, the web page to be deleted, the first computer 10 displays the page deletion confirmation screen depicted in FIG. 38 on the display 14 of the intermediate user mobile telephone 12 (quoting FIG. 38). Since the website creation system allows the intermediate user to delete an unnecessary web page by using the intermediate user mobile telephone 12, it is possible to make attractive web pages while deleting an unnecessary web page via the intermediate user mobile telephone 12.

The intermediate user visits an end user's shop, for example, shows a website including a web page of the end user, the web page created via the intermediate user mobile telephone 12, to the end user, and promotes the attractiveness of the system that can use the web page as a web page of the end user as it is by using the end user mobile telephone 13 and can edit and update the web page easily via the end user mobile telephone 13. When the end user likes the system and decides to introduce it, a procedure of registration of the end user to the first computer 10 (the system) is performed.

Incidentally, it is only necessary to register the end user mobile telephone 13 in the first computer 10 (the system) just one time if the end user mobile telephone 13 is one and the same mobile telephone, and there is no need to perform a registration process more than once. The computer 10 makes the end user mobile telephone 13 send a text message (a blank message) to a posting e-mail address (a posting e-mail address of the mobile e-mail server of the first computer 10) of the website of the end user (e-mail sending second requesting unit). The end user sends a text message (a blank message) to a designated posting e-mail address from the end user mobile telephone 13. To the computer 10, an e-mail address of the end user mobile telephone 13 and an end user mobile telephone identification number that identifies the end user mobile telephone 13 are transmitted.

When the text message is sent from the end user mobile telephone 13 to the first computer 10, the computer 10 registers (stores) the e-mail address of the end user mobile telephone 13 in the hard disk and registers (stores) the end user mobile telephone identification number of the end user mobile telephone 13 in the hard disk (e-mail address second registering unit). The computer 10 stores the e-mail address of the end user mobile telephone 13 in the hard disk in a state in which the e-mail address of the end user mobile telephone 13 is associated with the end user mobile telephone identification number.

After storing the e-mail address and the end user mobile telephone identification number of the end user mobile telephone 13 in the hard disk, the first computer 10 generates an end user registration URL (a URL for logging in to the first computer) corresponding to the e-mail address of the end user mobile telephone 13 and stores the generated end user registration URL in the hard disk in a state in which the generated end user registration URL is associated with the e-mail address and the end user mobile telephone identification number of the end user mobile telephone 13. After storing the end user registration URL in the hard disk, the computer 10 transmits the generated end user registration URL to the end user mobile telephone 13 by using the e-mail address of the end user mobile telephone 13 (URL second transmitting unit).

To the end user mobile telephone 13 of the end user who sent the text message, a text message displaying the end user registration URL is sent from the first computer 10. The end user who received the end user registration URL can log in to the computer 10 (the system) by clicking the end user registration URL displayed on the display 16. When the URL displayed on the display 16 of the end user mobile telephone 13 is clicked, the end user mobile telephone 13 logs in to the computer 10 (the system), and the registration process screen of the mobile telephone 13 is displayed on the display 16 of the mobile telephone 13 (quoting FIG. 40). Incidentally, as the identifier, the identifier registered from the intermediate user mobile telephone 12 in the computer 10 when the website was established by the intermediate user mobile telephone 12 is used. The end user gets the identifier from the intermediate user at the time of registration of the end user mobile telephone 13.

When the identifier is entered in the identifier entry area 40*b* and the registration button 40*c* is clicked, the identifier entered in the identifier entry area 40*b* is transmitted to the computer 10. The first computer 10 applies the transmitted identifier to the identifier stored in the hard disk, and, if an identifier identical to the transmitted identifier is stored in the hard disk and end user registration is not performed in the website corresponding to the identifier, the first computer 10 approves the user registration of the end user. If an identifier identical to the transmitted identifier is not stored in the hard disk or end user registration is already performed in the website corresponding to the identifier, the computer 10 displays a user registration not-approved message on the display 16 of the end user mobile telephone 13.

After approving end user registration, the first computer 10 sets a registration flag on the e-mail address and the end user mobile telephone identification number of the end user mobile telephone 13 (end user registering unit). After setting the registration flag, the computer 10 displays the end user registration completion screen on the display 16 of the end user mobile telephone 13 (quoting FIG. 41).

When the end user creates a web page, the end user clicks, by using the end user mobile telephone 13, the end user registration URL displayed thereon or clicks the login button after entering the end user registration URL. When the end user mobile telephone 13 logs in to the computer 10 (the system), the web page screen of the end user is displayed on the display 16 of the end user mobile telephone 13 (quoting FIG. 42). The first computer 10 publicizes the website including the web page displayed on the display 16 of the end user mobile telephone 13 through the Internet 15 (website second outputting unit).

When the administration menu button 42*f* is clicked on the web page screen displayed on the display 16 of the end user mobile telephone 13, the first computer 10 displays the administration menu screen on the display 16 of the end user mobile telephone 13 (quoting FIG. 30). The end user mobile telephone 13 is used to click the information-to-be-posted creation button on the administration menu screen. When the information-to-be-posted creation button is clicked, a mailer is launched, and login to the mobile e-mail server of the computer 10 is performed through use of the posting e-mail address of the website. The first computer 10 displays the web page creation screen on the display 16 of the end user mobile telephone 13 (quoting FIG. 31(*a*)). The end user enters a post by using the end user mobile telephone 13 and, after taking a picture to be posted, sends the post and the picture to be posted to the computer 10 as a text message.

When sending of the post and the picture to be posted to the computer 10 is finished, the first computer 10 pastes the picture to be posted in the posted picture display area and pastes the post in the post display area and displays the web page in the latest update display area, thereby creating the web page of the website (web page second creating unit). The computer 10 stores the created web page in the hard disk in a state in which the created web page is associated with the domain name of the website. The computer 10 displays the page posting completion message screen on the display 16 of the end user mobile telephone 13 (quoting FIG. 31(*b*)).

When the end user mobile telephone 13 logs in to the computer 10 (the system), the web page screen created by the end user is displayed on the display 16 of the end user mobile telephone 13. The first computer 10 publicizes the website including the web page displayed on the display 16 of the end user mobile telephone 13 through the Internet 15 (website second outputting unit).

The website creation system can create a web page of a website corresponding to a particular domain name by using a text message sent from the end user mobile telephone 13 and can create a web page of a website easily and promptly via the mobile telephone 13 of the end user. Since the website creation system creates a web page of each website for introducing a particular end user by using the end user mobile telephone 13, it is possible to promote a product and service of the particular end user to a wide range of people through the created web page, and, since the website including the created web page is publicized through the Internet 15, it is possible to pass on information on the product and service of the end user to the entire world through the Internet 15.

When the end user edits the web page, the end user clicks the page content alteration button on the administration menu screen (quoting FIG. 30) by using the end user mobile telephone 13. When the page content alteration button is clicked, the first computer 10 displays the page-to-be-edited selection screen on the display 16 of the end user mobile telephone 13 (quoting FIG. 33). When the page editing button is clicked on the page-to-be-edited selection screen, a page editing signal is transmitted to the computer 10, and the computer 10 determines that the page is to be edited and displays the web page editing screen on the display 16 of the end user mobile telephone 13 (quoting FIG. 34).

The end user can change the posted picture displayed in the posted picture editing area to another picture and change the posted text displayed in the posted text editing area to another text by using the end user mobile telephone 13. After the posted picture and the posted text are changed, the editing button is clicked. When the editing button is clicked, the first computer 10 displays the page editing confirmation screen on the display 16 of the end user mobile telephone 13 (quoting FIG. 35).

After the edited posted picture and the edited posted text are checked, the OK button is clicked on the page editing confirmation screen. When the OK button is clicked, the first computer 10 pastes the edited posted picture in the posted picture display area and pastes the edited post in the post display area and displays the web page in the latest update display area, thereby editing the web page of the website (web page second editing unit). The computer 10 publicizes the website including the edited web page through the Internet 15 (website second outputting unit).

The first computer 10 stores the edited web page in the hard disk in a state in which the edited web page is associated with the domain name of the website. The computer 10 displays the page editing completion screen on the display 16 of the end user mobile telephone 13 (quoting FIG. 36). When the TO EDITED PAGE button is clicked on the page editing completion screen, the computer 10 displays the edited web page on the display 16 of the end user mobile telephone 13.

Since the website creation system allows the end user to edit the web page of the website corresponding to the domain name by using the end user mobile telephone 13, it is possible to make attractive web pages while editing the web page via the end user mobile telephone 13. Since the website creation system edits the web page of the website for introducing itself by using the end user mobile telephone 13, it is possible to promote a product and service of the end user to a wide range of people through the edited web page. Since the website including the web page edited by the end user mobile telephone 13 is output through the Internet 15, the website creation system can pass on information on the product and service of the end user to the entire world through the Internet 15.

When a particular web page is deleted, the page deletion button is clicked on the page-to-be-edited selection screen (quoting FIG. 33). When the page deletion button is clicked, a page deletion signal is transmitted to the computer 10, and the first computer 10 determines that the page is to be deleted and displays the web page deletion screen on the display 16 of the end user mobile telephone 13 (quoting FIG. 37).

After checking the web page to be deleted again, the end user clicks the deletion button when deleting the web page. When the deletion button is clicked, the first computer 10 sets an ending flag (including an ending date and time) on the web page to be deleted and stores the web page in the hard disk with the ending flag (web page second deleting unit). Alternatively, the first computer 10 erases the web page from the hard disk (web page second deleting unit).

After storing the web page to be deleted in the hard disk with the ending flag or erasing, from the hard disk, the web page to be deleted, the first computer 10 displays the page deletion confirmation screen on the display 16 of the end user mobile telephone 13 (quoting FIG. 38). Since the website creation system allows the end user to delete an unnecessary web page by using the end user mobile telephone 13, it is possible to make attractive web pages while deleting an unnecessary web page via the end user mobile telephone 13.

When end user registration is deleted, the intermediate user clicks the user deletion button 30*d* on the administration menu screen (quoting FIG. 30) by using the intermediate user mobile telephone 12. When the user deletion button 30*d* is clicked, the first computer 10 displays the user deletion screen on the display 14 of the intermediate user mobile telephone 12 (quoting FIG. 43). If there is a posting e-mail address to be deleted on the administration menu screen of FIG. 43, the deletion button 43*b* corresponding to the posting e-mail address is clicked. When the deletion button 43*b* is clicked, a deletion signal of the posting e-mail address is transmitted to the computer 10 from the intermediate user mobile telephone 12. The first computer 10 displays the user deletion confirmation screen on the display 14 of the intermediate user mobile telephone 12 (quoting FIG. 43).

After checking the posting e-mail address to be deleted, the intermediate user clicks the deletion button 44*c*. When the deletion button 44*c* is clicked, the first computer 10 sets an ending flag (including an ending date and time) on the posting e-mail address to be deleted and stores the posting e-mail address in the hard disk with the ending flag (end user deleting unit). Alternatively, the first computer 10 erases the posting e-mail address from the hard disk (end user deleting unit).

After storing the posting e-mail address to be deleted in the hard disk with the ending flag or erasing, from the hard disk, the posting e-mail address to be deleted, the first computer 10 displays the user deletion completion screen on the display 14 of the intermediate user mobile telephone 12 (quoting FIG. 45). By deleting the end user registration of an end user who does not desire to use the system and an end user who desires to terminate the use of the system, the website creation system can prevent the establishment of a website which is not necessary for the end user and the creation of an unnecessary web page.

EXPLANATIONS OF LETTERS OR NUMERALS 10 first computer
11 second computer
12 intermediate user mobile telephone
13 end user mobile telephone
15 Internet

The invention claimed is:

1. A website creation system that establishes various websites and creates web pages of the websites which the system established,
wherein
the website creation system includes
a first e-mail sending requesting unit that makes intermediate user mobile phones of a plurality of intermediate users who can establish websites for introducing a plurality of end users send e-mails to a predetermined e-mail address,
a first e-mail address registering unit that registers e-mail addresses of the intermediate user mobile phones when the e-mails have been sent from the intermediate mobile phones by the first e-mail sending requesting unit,
a first URL transmitting unit that transmits intermediate user registration URLs corresponding to the e-mail addresses to the intermediate user mobile phones by using the e-mail addresses of the intermediate user mobile phones registered by the first e-mail address registering unit,
a domain name registering unit that, when domain names have been applied for from the intermediate user mobile phones that have been logged in to the system, by using the intermediate user registration URLs, registers the domain names while being associated with the e-mail addresses of the intermediate user mobile phones,
a website establishing unit that establishes, by using the intermediate user mobile telephones that have logged in to the system and by using the intermediate user registration URLs, a plurality of websites corresponding to domain names registered by the domain name registering unit,
a first web page creating unit that creates web pages of the websites corresponding to the domain names by using text messages sent from the intermediate user mobile telephones that have logged in to the system by using the intermediate user registration URLs, and
a first website outputting unit that outputs, through the Internet, the websites including the web pages created by the first web page creating unit.

2. The website creation system according to claim 1, wherein
in the website establishing unit, posting e-mail addresses and identifiers transmitted from the intermediate user mobile telephones that have logged in to the system by using the Intermediate user registration URLs are registered in a state in which the posting e-mail addresses and the identifiers are associated with the e-mail addresses of the intermediate user mobile telephones.

3. The website creation system according to claim 2, wherein
the website creation system includes
a second e-mail sending requesting unit that makes end user mobile telephones of a plurality of end users who can create particular websites for introducing the end users send text messages to the posting e-mail addresses,
a second e-mail address registering unit that registers e-mail addresses of the end user mobile telephones when the text messages are sent from the end user mobile telephones by the second e-mail sending requesting unit,
a second web page creating unit that creates a web page of a website corresponding to a domain name of a particular end user, the web site established by the website establishing unit, by using the text messages sent from the end user mobile telephones that have logged in to the system, and
a second website outputting unit that outputs, through the Internet, the website including the web page created by the second web page creating unit.

4. The website creation system according to claim 3, wherein
the website creation system includes
a second URL transmitting unit that transmits end user registration URLs corresponding to the e-mail addresses of the end user mobile telephones to the end user mobile telephones by using e-mail addresses of the end users, and
an end user registering unit that registers the end users in the system by using the end user registration URLs and the identifiers, and
in the second web page creating unit, the end users registered by the end user registering unit can log in to the system and create a web page of the website.

5. The website creation system according to claim 4, wherein
the website creation system includes an end user registration deleting unit that deletes registration of an end user registered by the end user registering unit by using the intermediate user mobile telephone.

6. The website creation system according to claim 2, wherein
the website creation system includes a registered domain name deleting unit that deletes any one of a plurality of registered domain names in the intermediate user mobile telephones that have logged in to the system by using the Intermediate user registration URLs.

7. The website creation system according to claim 1, wherein
the website creation system includes a first web page editing unit that edits web pages of the websites corresponding to the domain names, the web pages created by the first web page creating unit, by using text messages sent from the intermediate user mobile telephones that have logged in to the system, and in the first website outputting unit, the websites including the edited web pages by the first web page editing unit are output through the Internet.

8. The website creation system according to claim 7, wherein
the website creation system includes a second web page editing unit that edits a web page of a website corresponding to a domain name of a particular end user, the website established by the website establishing unit, by using text messages sent from the end user mobile telephones that have logged in to the system, and
in the second website outputting unit, the website including the edited web page is output through the Internet.

9. The website creation system according to claim 1, wherein
the website creation system includes a first web page deleting unit that deletes a web page to be deleted of the websites corresponding to the domain names, the web pages created by the first web page creating unit, according to a web page deletion request transmitted from the intermediate user mobile telephones that have logged in to the system.

10. The website creation system according to claim 9, wherein
the website creation system includes a second web page deleting unit that deletes a web page to be deleted of a website corresponding to a domain name of a particular end user, the website established by the website establishing unit, according to a web page deletion request transmitted from the end user mobile telephones that have logged in to the system.

11. The website creation system according to claim 10, wherein
the website creation system includes a second web page editing unit that edits a web page of a website corresponding to a domain name of a particular end user, the website established by the website establishing unit, by using text messages sent from the end user mobile telephones that have logged in to the system, and
in the second website outputting unit, the website including the edited web page is output through the Internet.

12. The website creation system according to claim 11, wherein
in the second web page editing unit, a web page of a website is able to be edited by logging in to the system through use of the end user registration URL, and
in the second web page deleting unit, a web page to be deleted is able to be deleted by logging in to the system through use of the end user registration URL.

13. The website creation system according to claim 1, wherein
the website creation system includes a domain name charging unit that charges at least either the intermediate user mobile telephones or the end user mobile telephones for domain names when the domain names are registered by the domain name registering unit.

14. The website creation system according to claim 1, wherein
the website creation system includes a registered domain name displaying unit that displays a plurality of domain names that are already registered via the domain name registering unit on the intermediate user mobile telephones that have logged in to the system by using the intermediate user registration URLs.

15. The website creation system according to claim 1, wherein
the website creation system includes an access destination changing unit that changes, when the intermediate user mobile telephones access a particular domain name, an access destination to another URL that is different from the particular domain name.

* * * * *